United States Patent [19]

Gregory

[11] Patent Number: 5,787,405

[45] Date of Patent: Jul. 28, 1998

[54] METHOD AND SYSTEM FOR CREATING FINANCIAL INSTRUMENTS AT A PLURALITY OF REMOTE LOCATIONS WHICH ARE CONTROLLED BY A CENTRAL OFFICE

[75] Inventor: Edward M. Gregory, Fairview, Tex.

[73] Assignee: FFP Financial Services, L.P., Fort Worth, Tex.

[21] Appl. No.: 315,224

[22] Filed: Sep. 29, 1994

[51] Int. Cl.⁶ .............................. G06F 17/60; G07G 1/12
[52] U.S. Cl. .................. 705/45; 705/33; 395/240; 395/245; 395/201; 395/235; 235/381
[58] Field of Search .................. 364/401 R; 705/45, 705/1, 16, 30, 32, 33, 34, 39, 40; 395/201, 216, 221, 230, 232, 233, 239, 245, 240, 235; 235/7 R, 379, 381

[56] References Cited

U.S. PATENT DOCUMENTS

| Re. 33,172 | 2/1990 | Gruber et al. | 9/2 |
| 4,517,268 | 5/1985 | Gruber et al. | 9/2 |
| 5,347,302 | 9/1994 | Simonoff | 346/153.1 |
| 5,354,161 | 10/1994 | Chiba et al. | 412/9 |
| 5,369,709 | 11/1994 | Foreman et al. | 9/10 |
| 5,377,271 | 12/1994 | Foreman et al. | |
| 5,424,520 | 6/1995 | Lee | 235/380 |
| 5,457,305 | 10/1995 | Akel et al. | 235/379 |
| 5,477,037 | 12/1995 | Berger | 235/379 |

OTHER PUBLICATIONS

Lysford, "Create-A-Check", Management Accounting, Sep. 1, 1994.

O'Keefe, "Fast check Issuance by Tellers", Bank Systems & Technology, Oct. 1994.

"On-Site MICR Form System Enhance Security and Savings", Bank New Product News, Jan. 1991.

Zuckerman et al., "Print your own checks and save money!", Accounting Technology, Nov. 1993.

"With MICR toner you can print checks on your laser printer", PC Magazine, Sep. 28, 1993.

Jones, "Two enhancements for DOS accounting programs", PC World, Nov. 1, 1993.

Primary Examiner—Emanuel T. Voeltz
Assistant Examiner—Patrick Assovad
Attorney, Agent, or Firm—Locke Purnell Rain Harrell

[57] ABSTRACT

In the present invention, utilizing a data processing system at one location such as the home office, and another data processing system at a remote location such as a convenience store, an authorized convenience store employee may print financial instruments. According to the present invention, pre-printed forms are not needed in order to print financial instruments. When a financial instrument is to be printed, a valid password must first be entered. Thereafter, the employee may insert blank paper into the printer included within the remote data processing system and print a complete financial instrument. All necessary parameters may be printed by the remote data processing system, including financial institution identification number, account number, financial instrument number, date, amount, and payee. A transaction log may be automatically maintained by the remote data processing system. A log entry may be created each time a financial instrument is created. The log entry may include type of financial instrument created, financial instrument number, date, and amount. This information may be periodically transmitted to the home office data processing system.

15 Claims, 18 Drawing Sheets

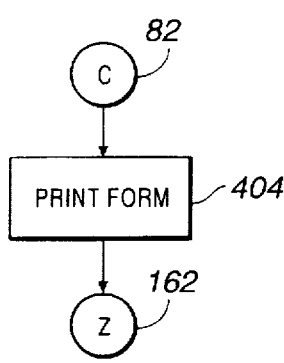
FIG. 3M
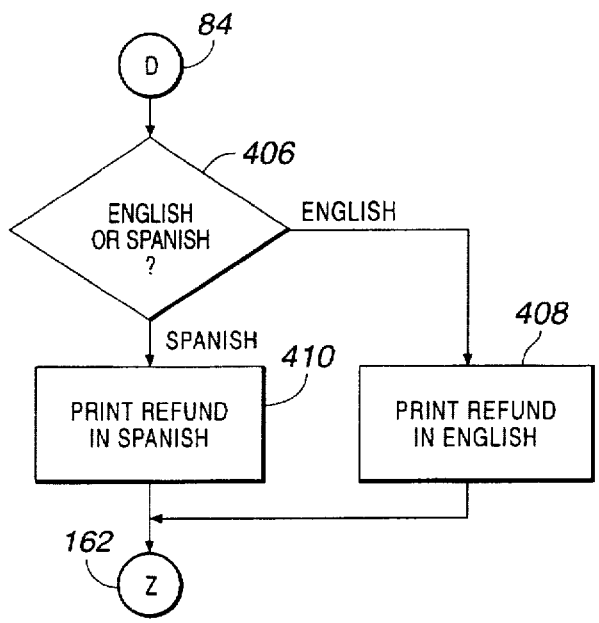
FIG. 3N
FIG. 3O
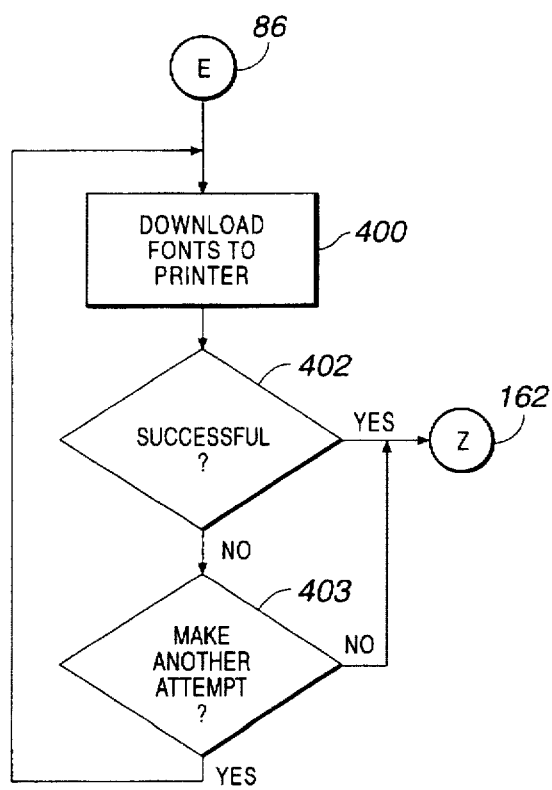

METHOD AND SYSTEM FOR CREATING FINANCIAL INSTRUMENTS AT A PLURALITY OF REMOTE LOCATIONS WHICH ARE CONTROLLED BY A CENTRAL OFFICE

BACKGROUND OF THE INVENTION

1. Technical Field

The present invention relates in general to data processing systems and in particular to a method and system within a data processing system for automatically creating a financial instrument utilizing blank paper. Still more particularly, the present invention relates to a method and system within a data processing system for automatically creating a financial instrument, utilizing blank paper, having a first and a second plurality of parameters.

2. Description of the Related Art

A financial instrument may be a written document which is legally capable of being transferred by endorsement or delivery. A financial instrument typically will include an unconditional promise to pay a sum certain in money payable on demand or at a definite time payable to the bearer or a particular person or entity. In order to be legally binding, a financial instrument will include a signature. Examples of types of financial instruments include personal checks, payroll checks, money orders, and beer drafts.

Some states may require that shipments of liquor or beer be paid for at the time of delivery. A "beer draft" is a financial instrument which may be used to pay for such a shipment. A beer draft will include an unconditional promise to pay a specified amount of money to a particular beer or liquor vendor. Therefore, upon receipt of a shipment of liquor, a beer draft may be issued to the vendor for the amount of the invoice of the shipment.

Financial instruments may be created by completing a pre-printed form, such as that supplied by a financial institution to be used as personal checks. These pre-printed checks are typically sold to a consumer by the financial institution. These checks typically are pre-printed with parameters including a number which identifies the associated financial institution, an account number, the printed name of the financial institution, a check number, and other personal information regarding the person or entity owning the account such as name, address, telephone number, or driver's license number.

These checks also include areas to be completed by the person or entity owning the account. In order to draw funds against the account, the person must complete the financial instrument, in this case the personal check, by filling in the areas. The person will typically add parameters such as a date, payee to whom the financial instrument is being transferred, an amount, and a signature. Once the check is completed, it becomes legally negotiable.

The owner may keep a record of transactions by manually entering each transaction into a log typically supplied by the financial institution with the pre-printed checks. The owner usually enters a check number, data, payee, and amount of the check into the log.

Some known data processing systems permit a user, an owner of an account, to create a financial instrument using the data processing system which includes a printer, and a pre-printed form. In these systems, the parameters include date, payee, and amount are received by the data processing system. The data processing system may then create the financial instrument by printing the received parameters, utilizing the printer, on the pre-printed form. In order to become legally negotiable, the user must sign the printed financial instrument.

These data processing systems may create a record of transactions by entering each transaction into a log typically maintained and stored within the data processing system. The data processing system usually enters a check number, data, payee, and amount of the check into the log.

Payroll checks are typically created in a manner similar to that described above for printing personal checks using a data processing system. These payroll checks are also typically printed on pre-printed forms.

Money orders are another example of a type of financial instrument. It is known in the prior art to be able to print money orders using a data processing system and printer. A user is supplied with pre-printed money order forms. These pre-printed forms may be numbered in sequence and may include similar pre-printed parameters such as those discussed above for personal checks. These pre-printed parameters may include a number which identifies the associated financial institution, the money order number, and other information such as the printed name of the financial institution. The user may enter parameters such as a payee, date, and amount. The data processing system then prints these parameters on the pre-printed money order form.

The data processing system may maintain a record of the transaction. In these systems, the record includes a list of money order numbers. The user is supplied with pre-printed money orders having corresponding numbers to those already recorded. A user must insert the pre-printed money orders into the data processing system in a particular order, typically numerical order. Each time a money order is printed using the data processing system, the date and amount may be entered into the record and associated with its corresponding money order number. If the pre-printed money orders are not in the proper sequence, the record will not maintain an accurate report of the date and amount for the particular money order number.

SUMMARY OF THE INVENTION

The present invention has the goal of 1) providing an efficient, compact system to print money orders, payroll checks and negotiable checks to vendors, known as "beer drafts," 2) employing low maintenance equipment, 3) automating the recording of transactions involving payroll checks, money orders, beer drafts or other drafts, which results in less human error, 4) eliminating the need to deliver payroll checks from a remote central location, 5) providing vendor drafts in real time at the point of delivery, 6) creating a flexible and expandable system to create financial instruments at remote locations tied to a central office.

It is therefore one object of the present invention to provide an improved data processing system.

It is another object of the present invention to provide a method and system within a data processing system for automatically creating a financial instrument utilizing blank paper.

It is yet another object of the present invention to provide a method and system within a data processing system for automatically creating a financial instrument, utilizing blank paper, having a first and a second plurality of parameters wherein the first plurality of parameters are -data or identification which relate to a particular type of financial instrument and remain constant from transaction to transaction and the second plurality of parameters are data or identification which may vary from that of the prior or succeeding transactions.

Another object of the invention is to enhance flexibility by allowing the central office to quickly and easily change ones of the constant fixed first plurality of parameters instantly in real time for all remote locations at the same point in time.

A further object of the present invention related to the previous object is to simplify operation of a system of financial instrument utilization by eliminating the need to order, control or destroy inventories of preprinted form instruments if an account number or financial institution, for example, is to be changed for business reasons.

Financial instruments such as money orders are often sold by convenience stores. In known systems, blank money order forms are supplied to the convenience store. These forms include pre-printed information such as a money order number, financial institution name on which the money order may be drawn, and blank areas to be completed during each transaction. A blank money order form may then be completed by printing a payee's name, amount in words and numbers, and date in the appropriate blank area.

Often the money order is printed utilizing a computer system having a printer. In these systems, a transaction log may be maintained which may initially include a list of money order number in an expected sequence. After a money order is sold, the date, amount, and other information may be included in the transaction log and associated with the next money order number in the sequence.

A problem occurs in these systems when the preprinted money order forms are not sold and printed in the sequence expected by the transaction log. There are numerous problems which could cause the money order forms not to be printed in the expected sequence. For example, the forms may be loaded into the printer in the wrong sequence. The forms may not be aligned properly within the printer during printing thus causing the printed information to be illegible and the money order to be unusable.

When the money order forms are not printed in the expected sequence, the date and amount of a money order may not be associated with the correct money order number. When this occurs, the transaction log will not be an accurate record of the money orders sold and tracing or matching will be difficult. These problems are eliminated because the present invention prints the number of the money order on the money order and records it in the log. The money orders printed sold each day are automatically accurately recorded and phoned in as a report to the home office computer. An internal record of the current sequence numbers eliminates the problem of mismatching the record sequence with the physical sequence for money orders. Beer drafts are recorded and reported to the home office in the same fashion. The elimination of mismatching between the record of the transaction and the transaction document solves a serious problem because when the money orders are cashed, the bank or money order company reports back with the information on the transaction document to report how much they deducted from the seller's account. The money order seller has to be able to determine if they really sold that money order in order to maintain control of their accounts, prepare reports and prevent fraud. These functions all require use of the money order or check number, which for the first time will now correspond to the recorded log of transactions.

In addition to being more reliable, the process of issuing and recording information on money orders sold and checks issued and reconciling that information is greatly speeded up. The security risk inherent in storing preprinted money orders at convenience stores or other remote locations, is greatly eliminated because the invention requires only blank paper. In addition, limitations as to who can print transaction documents and the maximum transaction amount that can be printed is under control of the home office through a password and a limitation on the amount a money order, beer draft or other transaction document can be issued for.

Some convenience stores also receive shipments of liquor which may require immediate payment by the convenience store to the liquor vendor by issuance of a beer draft. It is known for a convenience store to provide its employees with a blank checkbook and expect an authorized employee to write a check for the invoice amount once a shipment is received, and to properly maintain a record of each check.

However, when a store permits an employee to issue checks and keep an accurate record of each transaction, a series of problems may arise. For example, the employee may neglect to keep a record of the transaction, or may not correctly record the transaction. Further, in this system, no security is maintained. A dishonest employee may easily write unauthorized checks. These problems are eliminated because the manager at the store location is now able to print his checks on demand at the store location which are recorded automatically and sent back to the home office for control purposes.

Another problem experienced by companies having numerous convenience store locations occurs during the printing and distribution of the payroll. Often, the company will have a home office location, and numerous convenience stores which may be located within the same city as the home office or may be located thousands of miles away from the home office. The company will typically pay its convenience store employees on a weekly basis. The check is typically given to the employee at the end of the week and includes the salary earned by the employee for the current or previous week.

For a company having multiple store locations and many employees, it is difficult and expensive to produce checks every week at many remote store locations that accurately reflect the amount earned by a particular employee during the week. These employees are often paid on an hourly basis. The number of hours worked each week by a particular employee may vary from week to week. In addition, for various reasons, an employee may not work the hours in a week that the employee was initially scheduled to work.

Therefore, a company will often wait until shortly before the payday to print the payroll. Once the payroll has been printed, it may be sorted according to store location. Thereafter, in order to have the checks available to the employees on the appropriate date, the company may use an overnight shipping service. The weekly cost of sorting checks according to location and then sending the checks utilizing an overnight shipping service can be very high where the company has many stores and hundreds or thousands of employees.

Problems may occur in the above describe method of issuing payroll checks. For example, the amount of the issued check may be incorrect. When this occurs, the employee must wait an additional period of time to receive a paycheck. In addition, the entire payroll shipment to a particular store could be delayed or lost causing the need to reissue the checks. These problems are eliminated with the present invention because the manager at the store location is now able to print his payroll on demand at the store location and the payroll is recorded automatically on a log and sent back to the home office for control purposes.

According to the present invention, pre-printed forms are not needed in order to print financial instruments such as money orders and beer drafts. When a money order is to be printed, a valid password must first be entered. Thereafter, the employee may insert blank paper into the printer included within the remote data processing system and print a complete money order. All necessary parameters will be printed by the remote data processing system.

Pre-printed money order forms include parameters as described above such as a money order number, financial institution name and account number. These fixed parameters which have been pre-printed on money order forms in known systems, may now be printed on blank paper at the remote data processing system by the present invention. In addition to printing these parameters, in accordance with the present invention, the variable parameters such as amount and date are also printed on the paper simultaneously with the money order number, financial institution name and account number.

After a money order is printed, the parameters are recorded in a log. The money order number will be associated with the date and amount. In this manner, problems associated with known systems may be avoided. In the present invention, utilizing blank paper instead of pre-printed forms, money order numbers are printed and recorded simultaneously with the date and amount. Therefore, no particular sequence of money order number is expected or necessary.

Only those authorized employees with a valid password may print the payroll checks. On the day specified for paying the store employees, the authorized employee may utilize the remote data processing system to print payroll checks on blank paper loaded into the printer. In this system, fixed parameters necessary for printing payroll checks may be automatically downloaded to the remote data processing system by the data processing system at the home office. These parameters include the employee's name, date, amount, financial institution name, facsimile signature and account number. In this manner, checks may be printed remotely at the store location, thus eliminating any need for delivering the checks overnight.

If the amount a particular employee is to be paid changes, the change may be forwarded to the home office data processing system, and immediately incorporated into the parameters downloaded to the remote location. Therefore, the checks that are printed will accurately reflect the employees' earnings. If, however, an error occurs, the authorized employee may notify the home office and print corrected checks immediately. The home office data processing system includes conventional routines that enable the printing of check stubs along with the checks themselves, and in the case of payroll checks the check stub will have printed on it the usual tax withholding information, normal deductions from pay and year-to-date information for taxes and earnings as is conventional.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
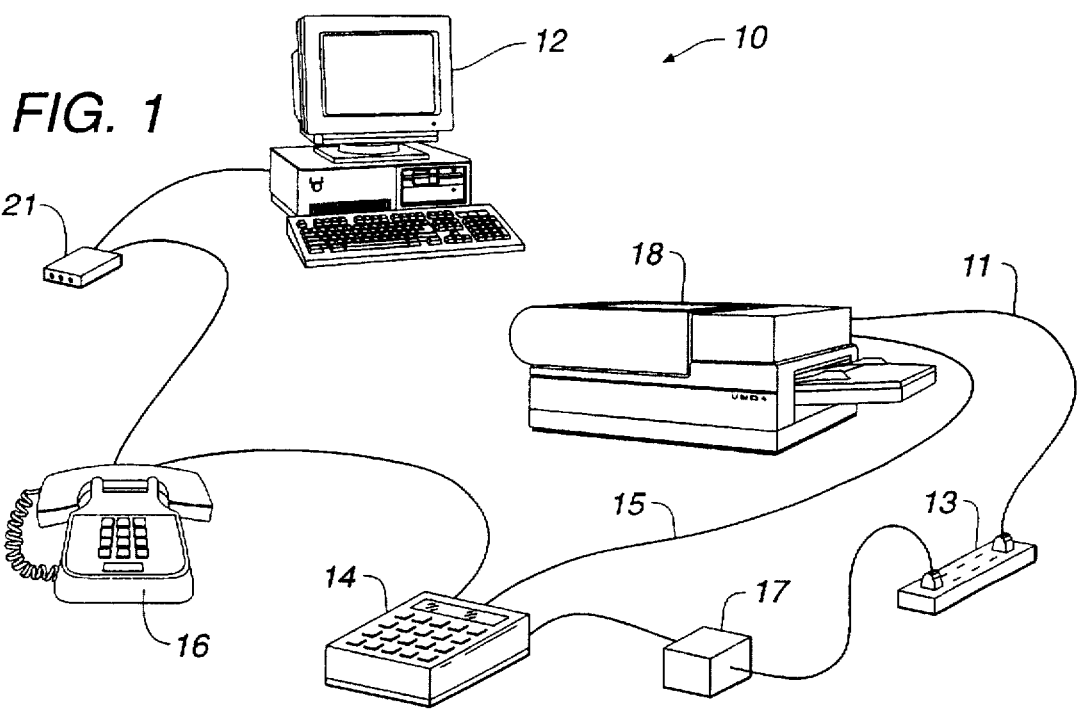
FIG. 1 is a pictorial representation of a data processing system which may be utilized to implement the method and system of the present invention.

With reference to the figures and in particular with reference to FIG. 1, a pictorial representation of a data processing system 10 is illustrated which may be utilized to implement the method and system of the present invention. As may be seen, data processing system 10 may include a data processing system 12 which may communicate with a remote data processing system 14 via a telephone system 16 including a modem 21. Data processing systems 12 and 14 may be implemented by using any suitably configured computer system, such as an IBM compatible or a Macintosh. Data processing system 14 is preferably implemented by using a Verifone model OMMI 490 terminal available from Verifone, Inc., 3 Lagoon Drive, Redwood City, Calif. 94065. This is a compact unit which includes a modem and card reader. A Verifone TXO Workbench Package is a software development system available from Verifone, Inc. for use with the OMNI 490 series terminal. It is an integrated software package that allows an application to be easily developed for that terminal. Data processing system 14 may be linked, via cable 15, to a printer 18 which may be implemented utilizing any suitable printer such as a Brother model HL-10V or equivalent laser printer available from Brother Industries. Printer 18 is connected to a power source 13 via cable 11. Data processing system 14 is connected to power source 13 via cable 17.

Data processing system 10 may be utilized to automatically print financial instruments such as money orders, payroll checks, and beer drafts. Data processing system 10 may also automatically keep provide record keeping of printing activities. Data processing system 14 automatically records all pertinent information about money orders and beer drafts printed each day, as well as payroll checks printed, and communicates with data processing system 12 on a routine basis, such as daily, to transfer the pertinent information to data processing system 12.

For example, data processing system 14 may print a financial instrument such as money order or payroll check using blank paper. In known systems, data processing systems capable of printing money order or checks must be supplied with a pre-printed form which includes a first plurality of parameters. The first plurality of parameters may include the financial institution identification number, account number, check or sequence number, facsimile signature and other information. This includes any information related to a particular instrument which remains constant from transaction to transaction.

According to the present system, pre-printed forms are not necessary. Any suitable blank paper of the appropriate size may be used. The term "blank paper" is meant to preferably comprise any suitable "security paper" which may have background color or printing or distinctive watermarks or other overall indicia but which is otherwise unprinted as contrasted with preprinted forms. Data processing system 14 will automatically determine the first plurality of parameters necessary to print a particular type of financial instrument.

Data processing system 14 will then receive a second plurality of parameters to be printed with the first plurality of parameters in order to create a complete financial instrument. The second plurality of parameters may include a date, amount, payee, and other indicia that is not constant and varies from transaction to transaction. The second plurality of parameters may be received in response to a user entry of the parameters, or may be received from data processing system 12. At least some of the second plurality of parameters are input by the user, i.e., the amount. The date, for example, could be determined remotely and sent to the user location with the other input data since the date can be determined without user input even though it changes regularly.

In this manner, for example, payroll checks may be printed utilizing printer 18 by downloading necessary files from data processing system 12 to data processing system 14. The files may include the amount of the check, date, and facsimile signature. Data processing system 14 may determine the first plurality of parameters in order to create and print a complete payroll check.

Figure 2:
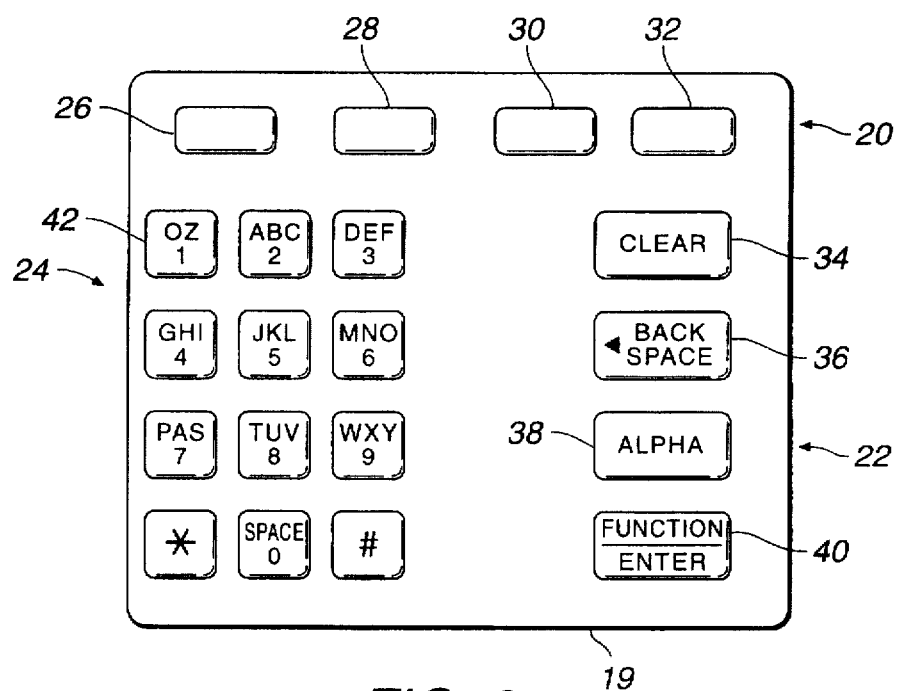
FIG. 2 is a pictorial representation of a keyboard within the data processing system of FIG. 1 in accordance with the present invention.

FIG. 2 is a pictorial representation of a keyboard 19 which may be utilized with data processing system 14. Keyboard 19 includes three groups of keys: (1) the menu selection keys 20, (2) the function keys 22, and (3) the telephone style numeric keys 24. Key 26 is the money order print key. This allows the user to begin printing all money orders that have been entered into the money order log.

Key 28 is unused. Key 30 is the left arrow key and key 32 is the right arrow key. These keys move the user through the menu selections. All menus are circular so that pressing one of the keys repeatedly will return the user to the starting position in the menu.

Function keys 22 are the four keys on the right side of the keyboard. Key 34 is the Clear Key. This is used to abort a function after it has been selected. Key 36 is the Backspace Key, which is used to correct typographical errors when entering data. Key 38, the Alpha Key, is used to enter alphabetic characters and punctuation. Key 40 is the Enter Key. Key 40 is used to select the current menu functions and to indicate that the user is finished entering data.

Numeric keys 24 are used to enter numeric data. The letters and punctuation above each of the keys can be accessed by typing the numeric key and then Alpha Key 38 one to three times. For example, to type a "B" the user would press a Key 42 corresponding to numeric Key 2 and then press Alpha Key 38 twice.

Printer 18 may be implemented utilizing a laser printer such as a Brother HL-10V. Printer 18 must be able to ignore a paper size error, or be able to print on paper that is eight and one half by seven inches.

Printer 18 must be fitted with a conventional MICR toner cartridge to enable a bank clearing house to determine that the printed check is valid and automatically process the check. The MICR toner contains a specified minimum percentage of a magnetic medium. The magnetic medium is required for automatic scanning of printed checks. The magnetically responsive characters are printed at the bottom of the instrument. The preferred format for the MICR encoded characters is in a grid with 37 rows down and 36 columns wide.

Data processing system 14 is preferably menu driven. The main menu may have six choices: (1) money order print, (2) manager functions, (3) cancellation form, (4) print refund form, (5) version information and (6) load fonts. To move between menu choices, a user may press either left arrow key 30 or right arrow key 32. A menu function may be selected by pressing enter key 40. Pressing clear key 34 will return the user to the main menu.

The manager function selection includes eleven choices: (1) print money order log, (2) print old money order log, (3) E-Mail, (4) force bulletin board call, (5) primary maintenance call, (6) secondary maintenance call, (7) daily closeout, (8) daylight savings, (9) upgrade software, (10) beer drafts, and (11) print payroll. In order to print a payroll, a manager's level password is required. For all other functions, an assistant manager's level password may be used.

Figure 3A:
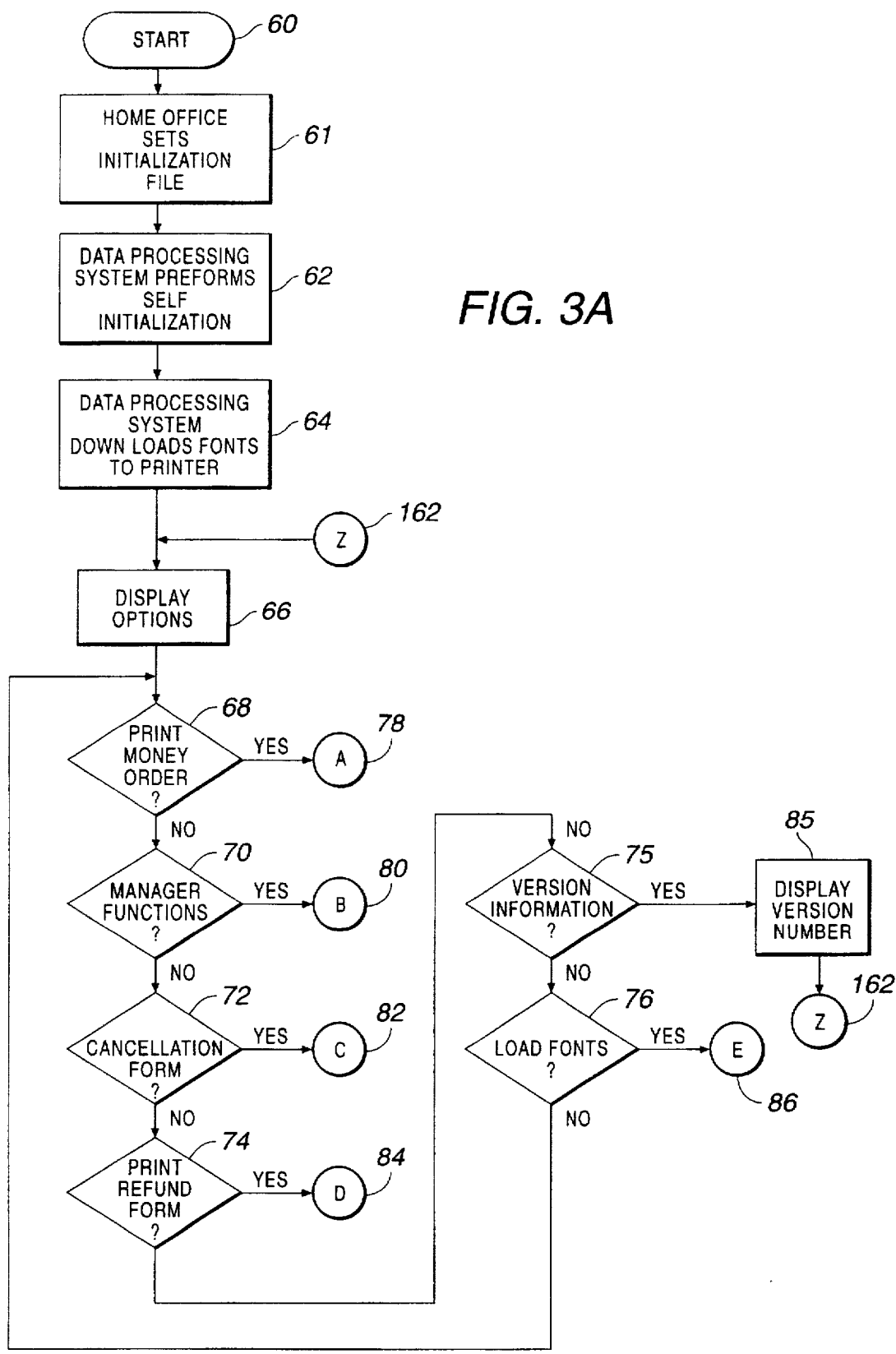
FIGS. 3-3S together form a high level flow chart which depicts the operation of data processing system of FIG. 1 in accordance with the present invention.
Figure 3B:
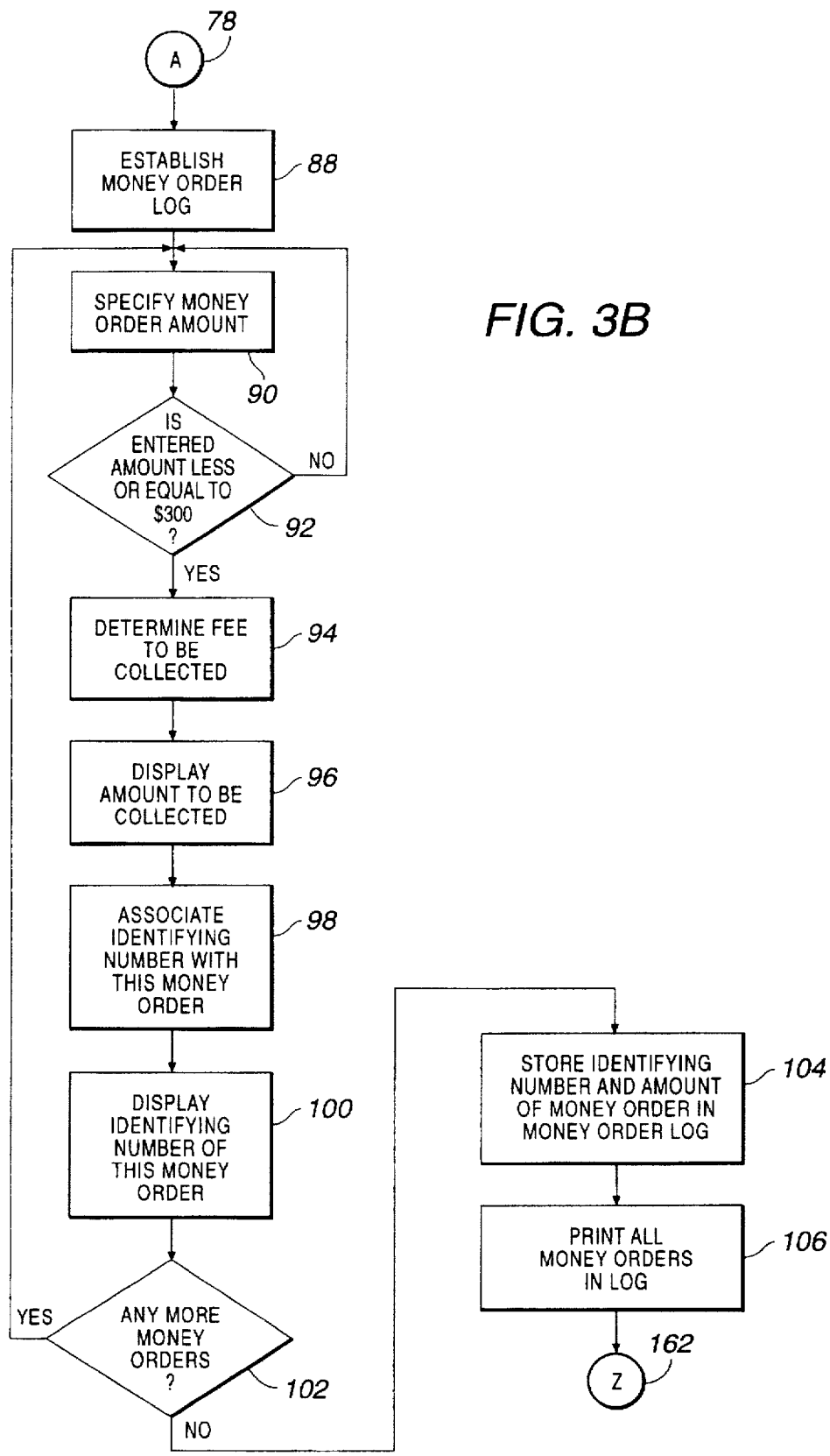
Figure 3C:
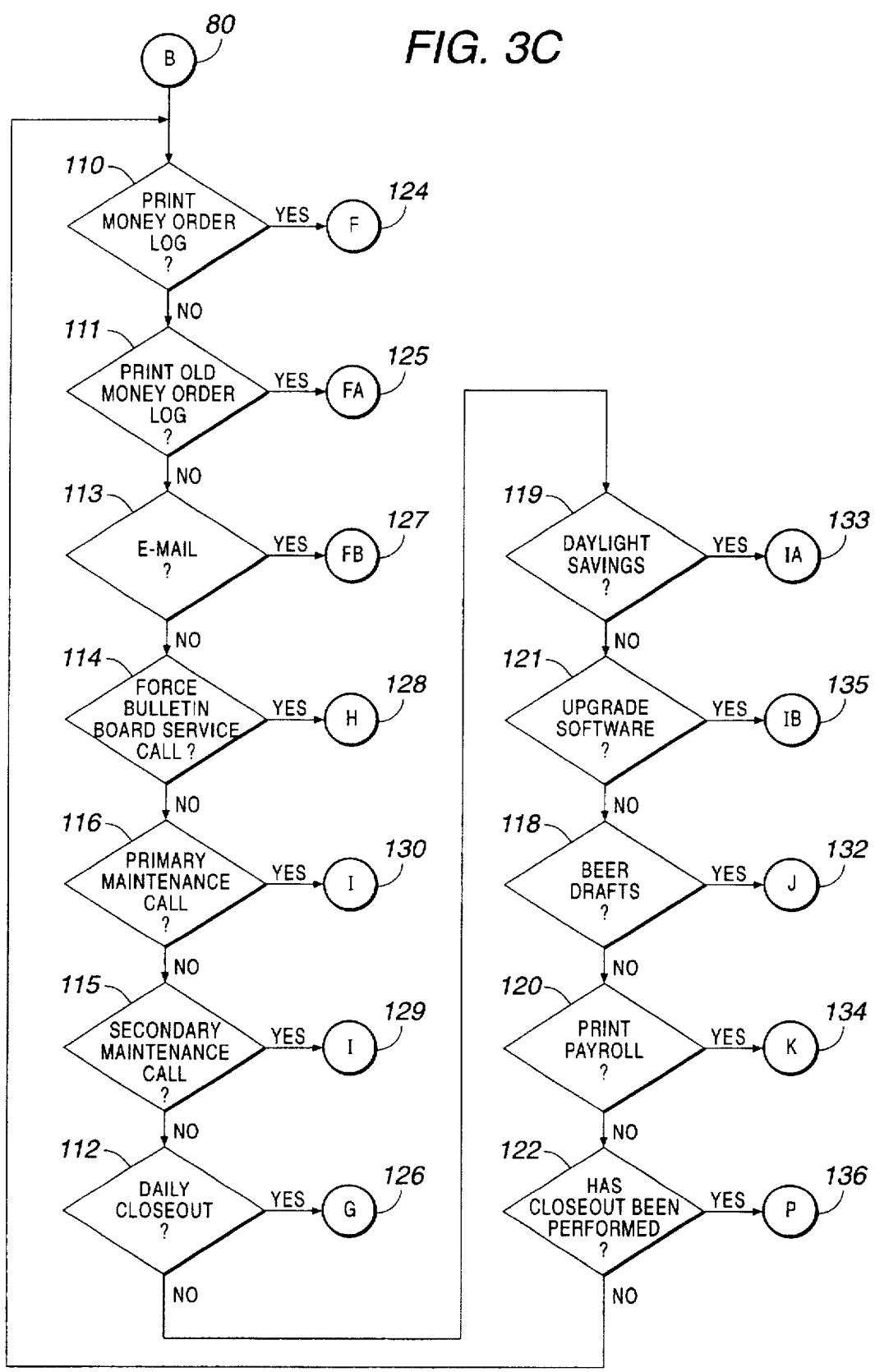
Figure 3D:
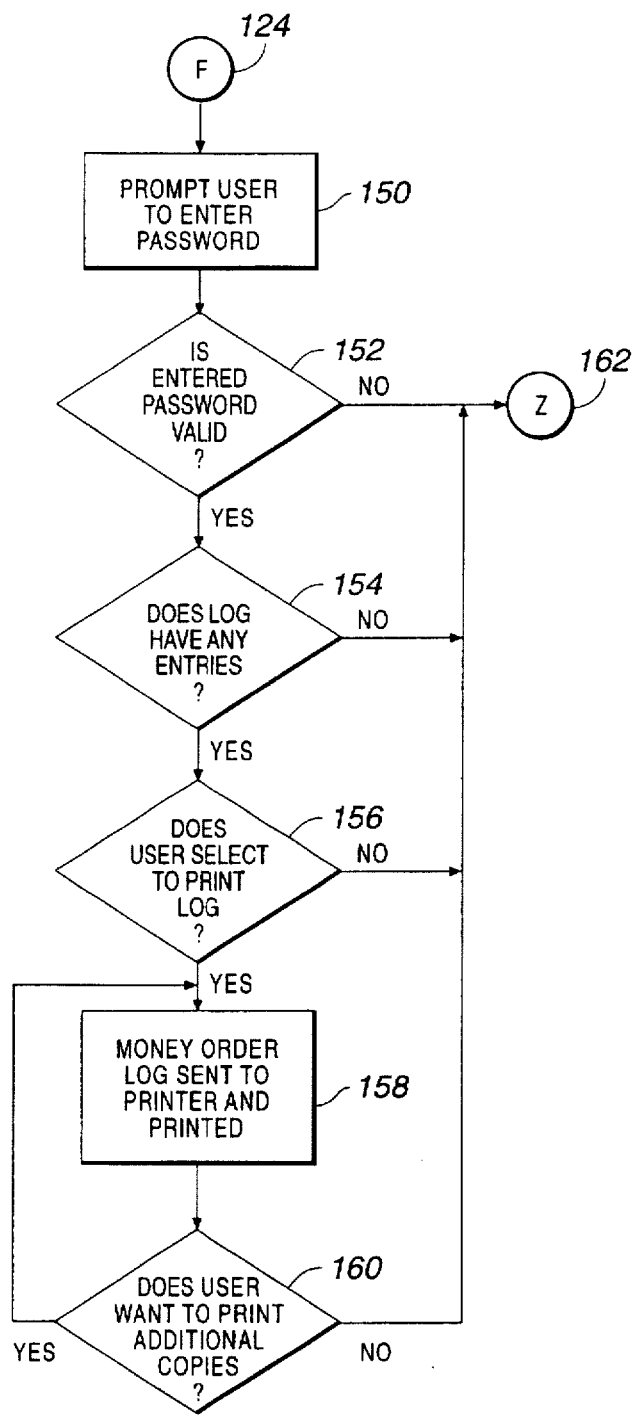
Figure 3E:
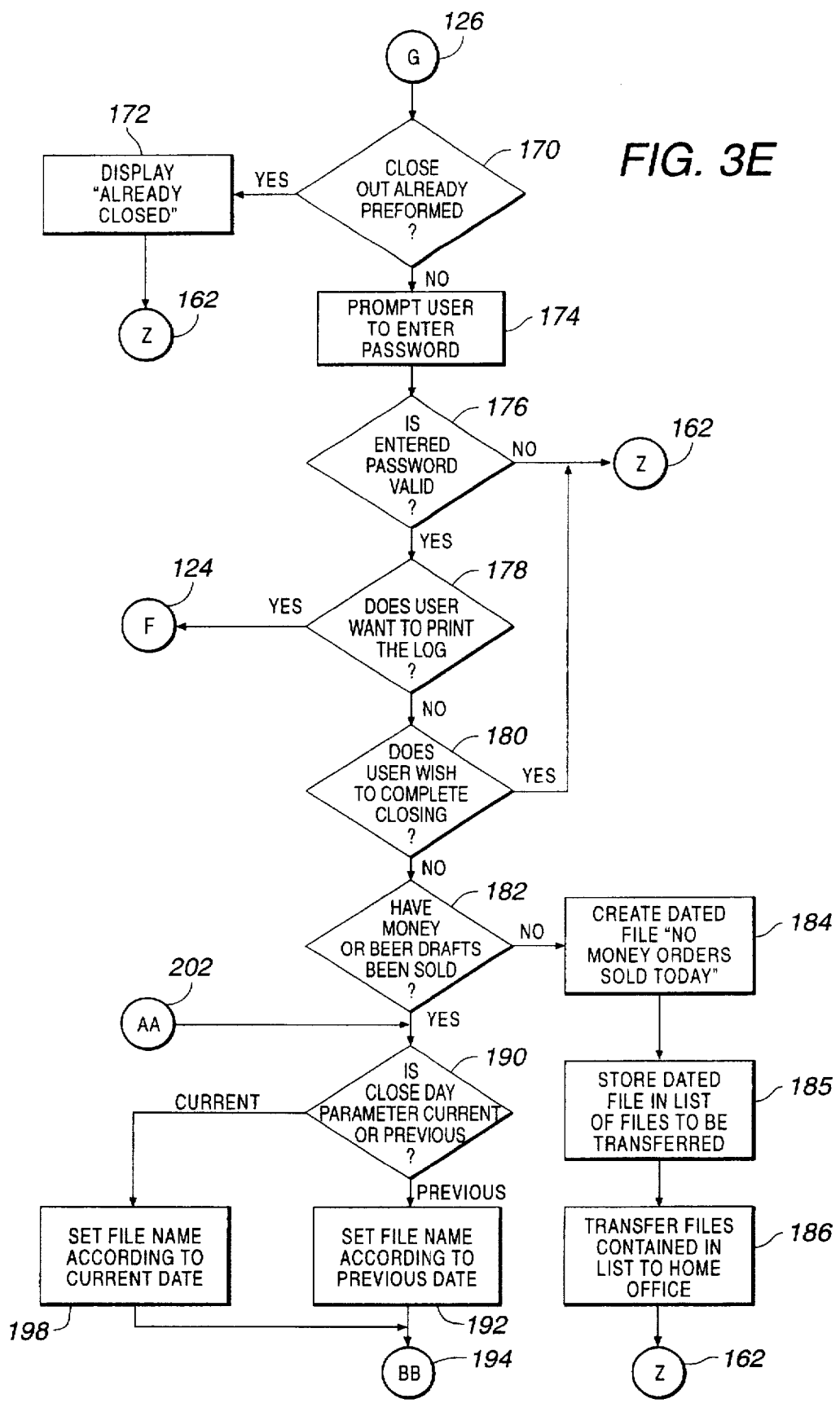
Figure 3F:
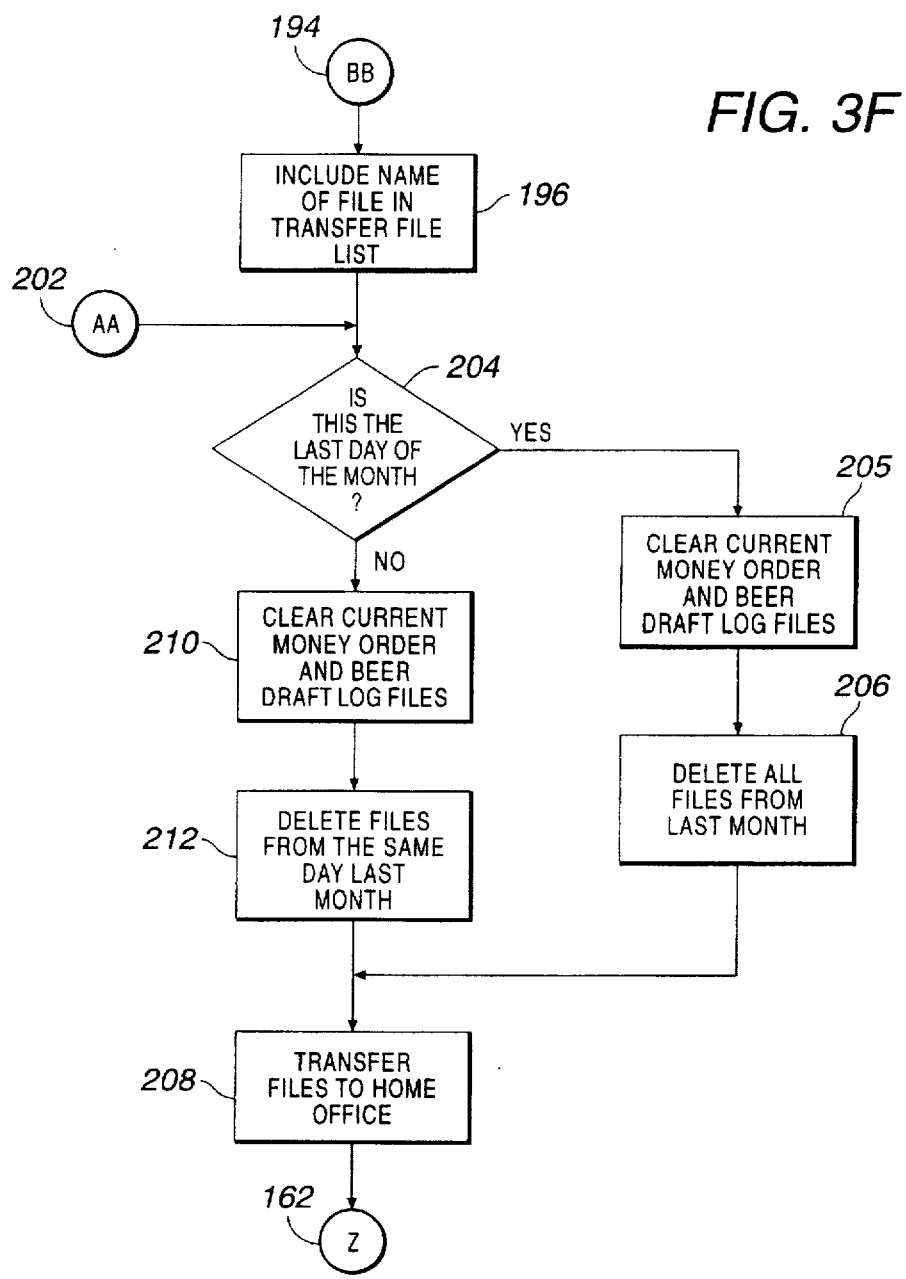
Figure 3G:
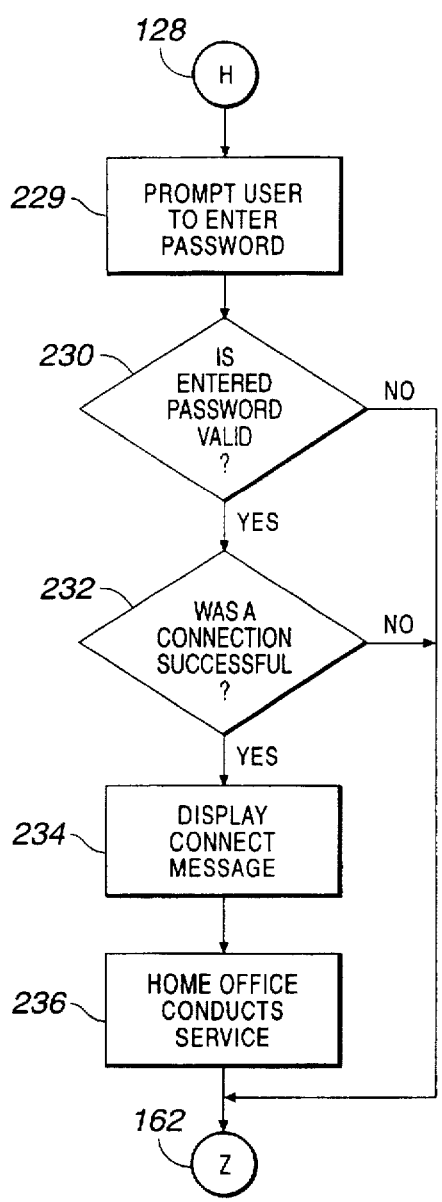
Figure 3H:
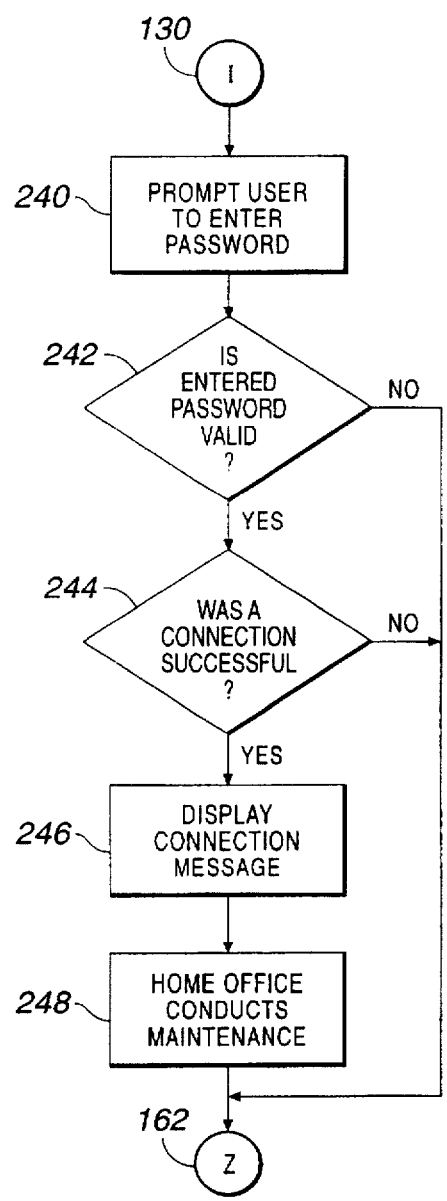
Figure 3I:
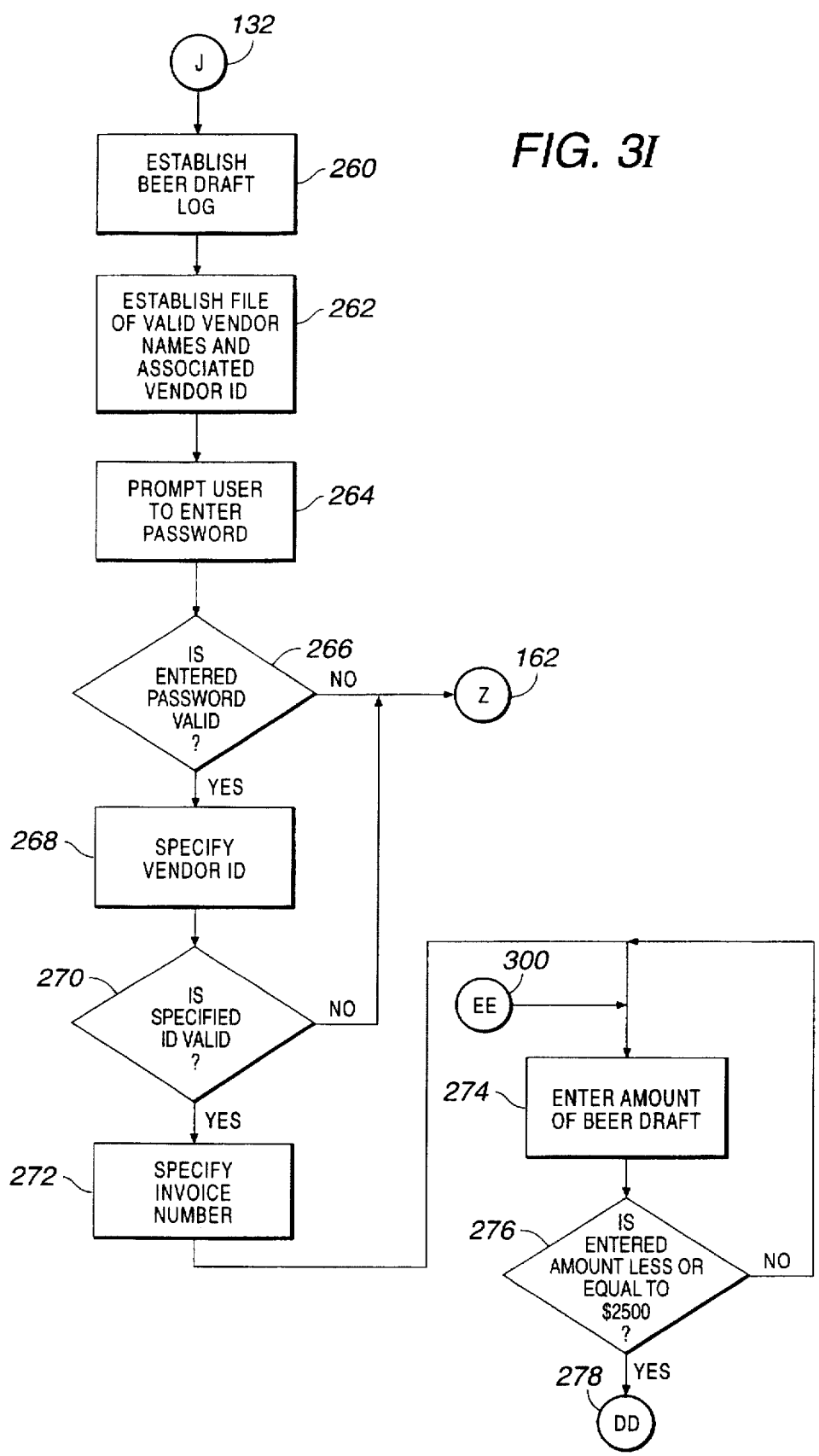
Figure 3J:
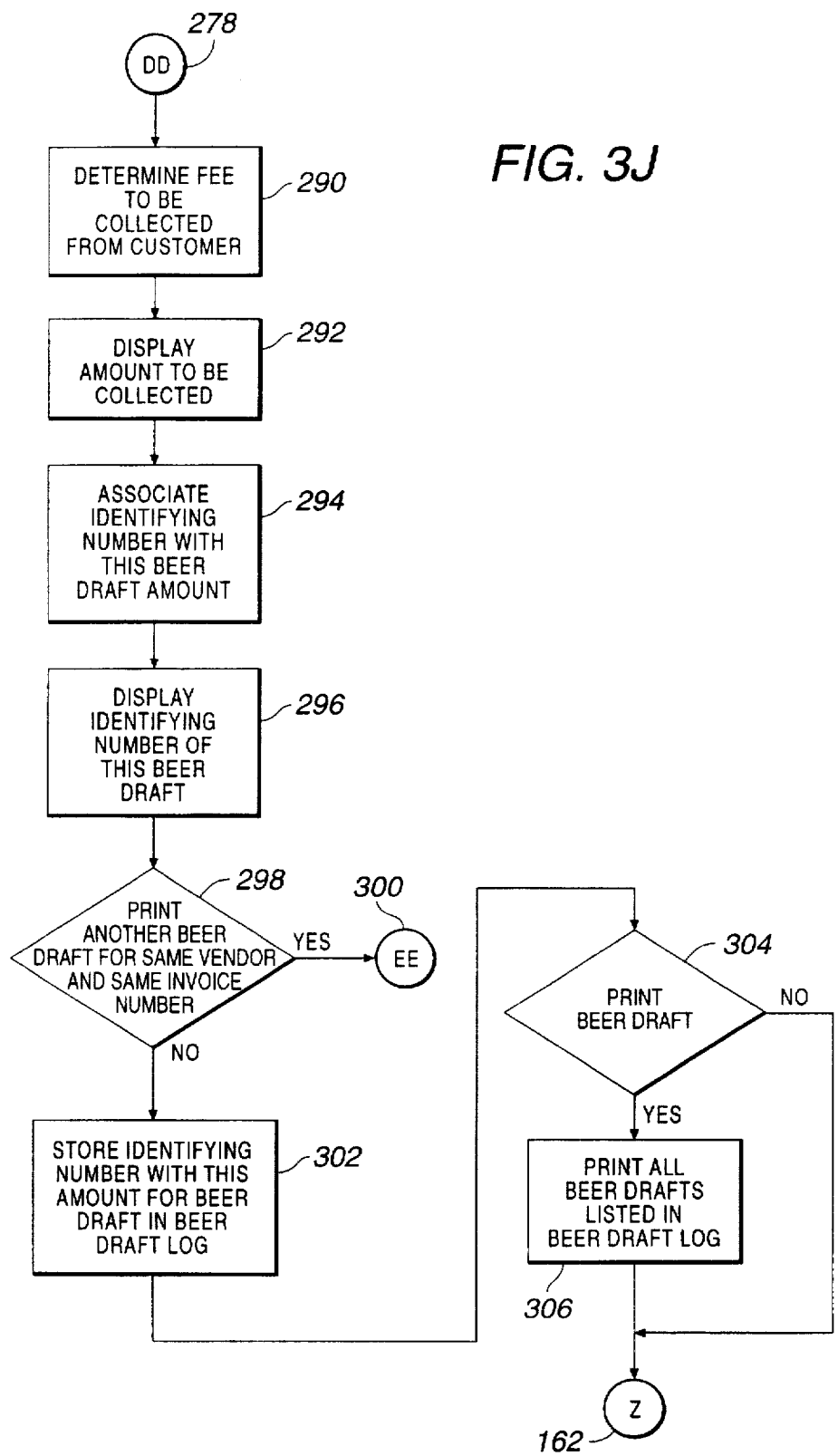
Figure 3K:
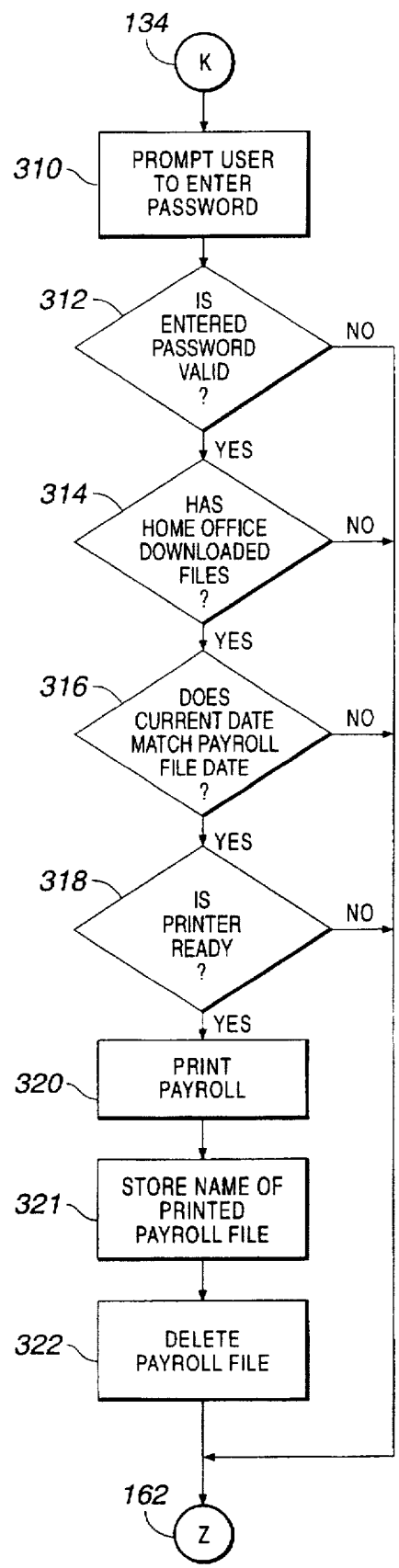
Figure 3L:
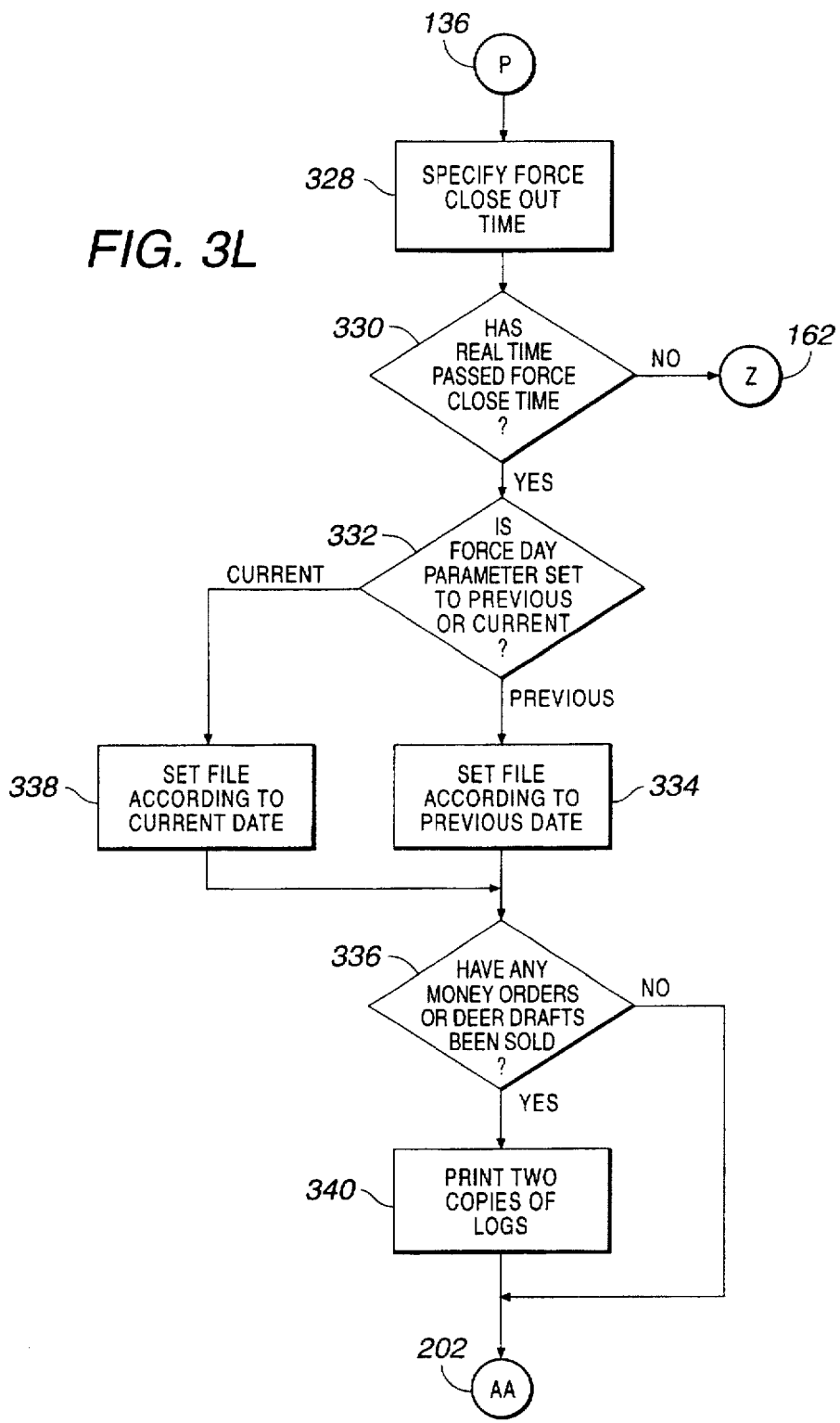
Figure 3P:
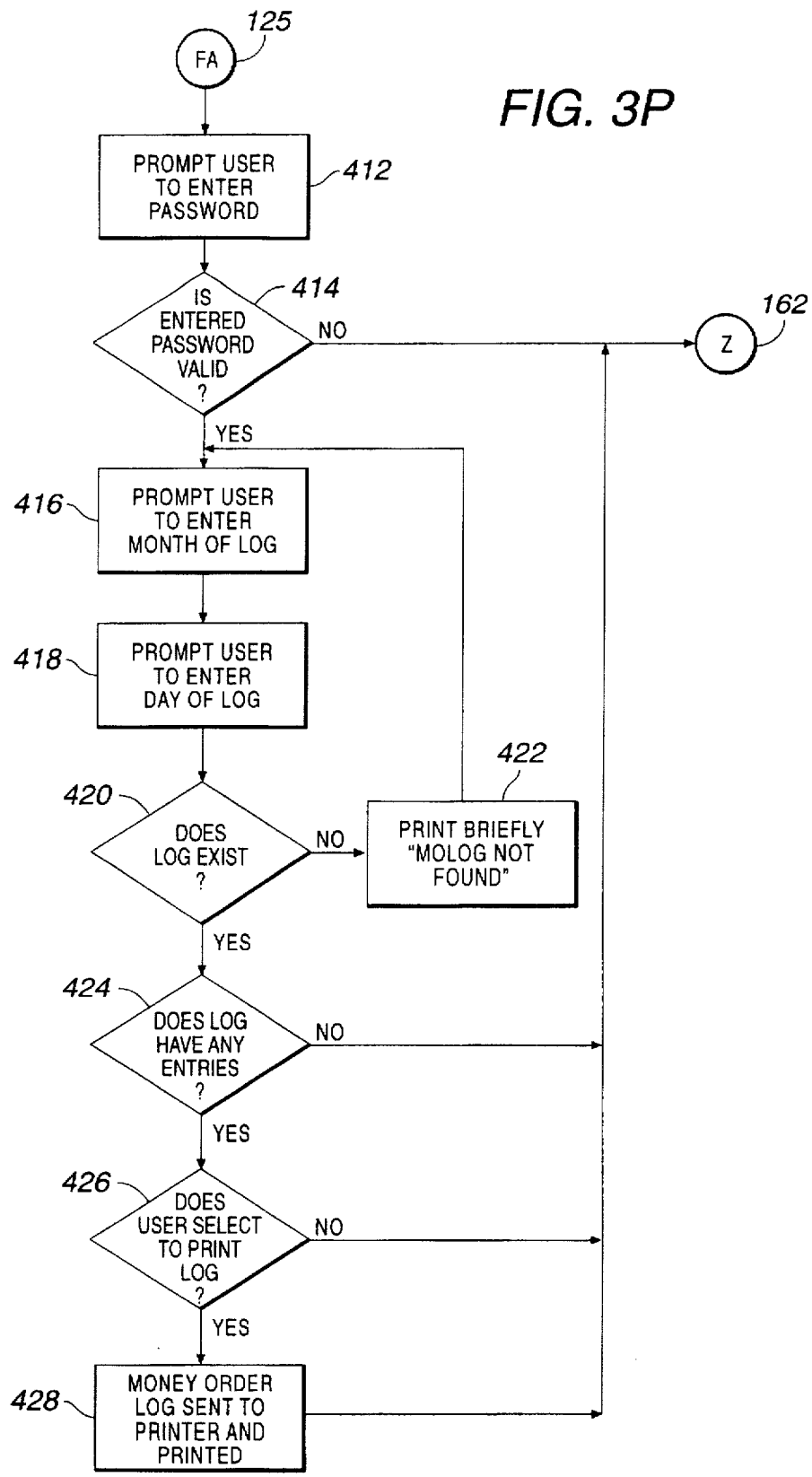
Figure 3Q:
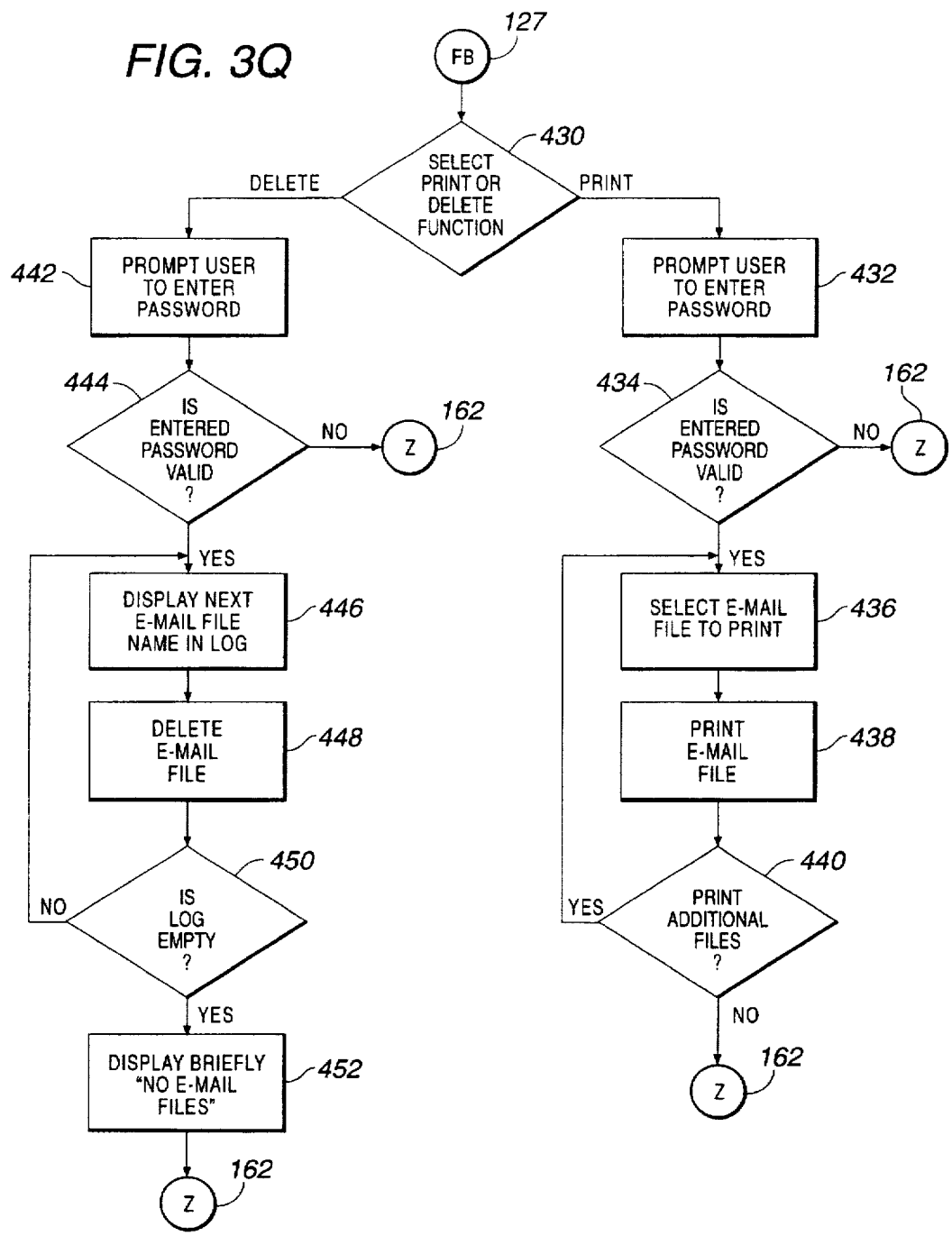
Figure 3R:
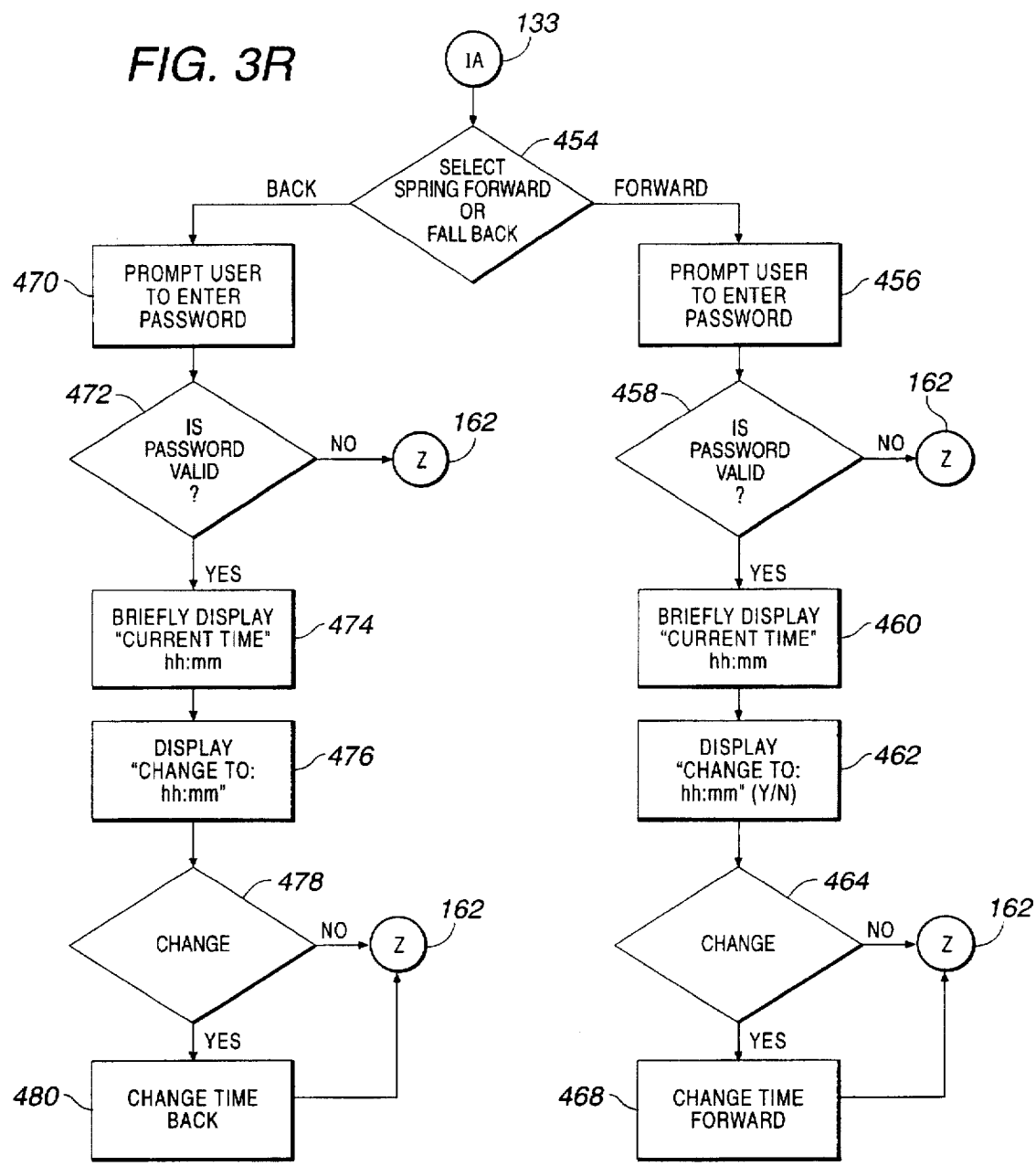
Figure 3S:
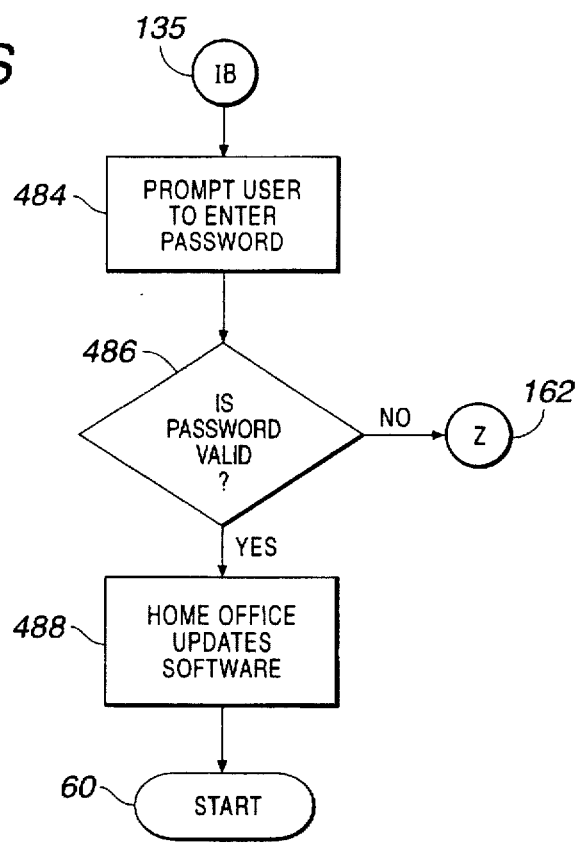

FIGS. 3A through 3S together form a high level flow chart illustrating the method and system of the present invention. The process begins at block 60 FIG. 3A and thereafter passes to block 61 which illustrates data processing system 12, which may also be called "home office," creating an initialization file for utilization by data processing system 14. Next the process passes to block 62 which illustrates data processing system 14 performing a self-initialization utilizing the initialization file created by data processing system 12.

Thereafter block 64 depicts data processing system 14 downloading fonts to printer 18. Next block 66 illustrates displaying options to a user. Thereafter the process passes to block 68 which illustrates a determination of whether or not the user wishes to print a money order. If a determination is made that the user does not wish to print a money order, the process passes to block 70 which illustrates a determination of whether or not the user wishes to select "Manager Functions". If a determination is made that the user does not wish to select "Manager Functions", the process passes to block 72 which depicts a determination of whether or not the user wishes to print a cancellation form.

If a determination is made that the user does not wish to print a cancellation form, the process passes to block 74 which illustrates a determination of whether or not the user wishes to print a refund form. If a determination is made that the user does not wish to print a refund form, the process passes to block 75. Block 75 illustrates a determination of whether or not the user wishes to access information on the software version. If a determination is made that a user does not wish to access version information, the process passes to block 76. Block 76 illustrates a determination of whether or not the user wishes to load fonts into printer 18. If a determination is made that a user does not wish to load fonts into printer 18, the process again passes to block 68.

Referring again to block 68, if a determination is made that the user wishes to print a money order, the process passes to block 88 of FIG. 3B as depicted through block 78. Block 88 illustrates the establishment of a money order log. Each time a money order is printed, data processing system 14 writes a description of the money order into the current money order log. The description includes the date and time of purchase, the store where the money order is purchased, the amount of the money order, the fee amount, and the check number.

The process then passes to block 90 which depicts a user specifying an amount for a money order. Next the process passes to block 92 which illustrates a determination of whether or not the entered amount is less than or equal to $300. A maximum possible amount for a money order may be arbitrarily determined by the home office. This maximum amount may be utilized to limit the company's liability when mistakes are made or a dishonest employee attempts to issue money orders. If a determination is made that the amount is over $300, the process again passes to block 90.

Referring again to block 92, if a determination is made that the amount is less than or equal to $300, the process passes to block 94 which illustrates a determination of the total amount of money to be collected from the customer. The amount is calculated by adding the money order amount to any fee charged for printing the money order. In addition, if additional money orders have been sold to the customer, the amount of any additional money order plus any fee to be charged is added to the amount of the current money order plus its fee.

The process then passes to block 96 which depicts the displaying of the total amount to be collected from the customer. Thereafter the process passes to block 98 which illustrates the association of an identifying number with the amount to be collected from the customer for the current money order plus its associated fee. The process then passes to block 100 which depicts the displaying of the identifying number for the current money order. Next, the process passes to block 102 which depicts a determination of whether or not any more money orders are to be sold. If a determination is made that there are more money orders to be sold, the process passes back to block 90.

Referring again to block 102, if a determination is made that no more money orders are to be sold, the process passes to block 104 which illustrates storing each identifying number and the associated total to be collected from the customer for that money order in the money order log. Thereafter the process passes to block 106 which illustrates the printing of a money order for the specified amount for each identifying number stored in the money order log. The process then passes back to block 66 as depicted through block 162.

Referring again to block 70, if a determination is made that the user selects "Manager Functions", the process passes to block 110 FIG. 3C as illustrated through block 80. Block 110 depicts a determination of whether or not the user wishes to print the money order log. If a determination is made that the user does not wish to print the money order log, the process passes to block 111 which depicts a determination of whether a user wishes to print an old money order log. If a determination is made that the user does not wish to print an old money order log, the process passes to block 113 which depicts a determination of whether a user wishes to access E-Mail. If a determination is made that the user does not wish to access E-Mail, the process passes to block 114 which illustrates a determination of whether or not the user wishes to force a bulletin board service call.

If a determination is made that the user does not wish to force a bulletin board service call, the process passes to block 116 which illustrates a determination of whether or not the user wishes to make a primary maintenance call. If a determination is made that the user does not wish to make a primary maintenance call, the process passes to block 115 which depicts a determination of whether a user wishes to make a secondary maintenance call. If a determination is made that the user does not wish to make a secondary maintenance call, the process passes to block 112 which depicts a determination of whether a user wishes to perform the daily close-out.

If a determination is made that the user does not wish to perform the daily close-out, the process passes to block 119 which depicts a determination of whether a user wishes to change to or from daylight savings time. If a determination is made that the user does not wish to change to or from daylight savings time, the process passes to block 121 which depicts a determination of whether a user wishes to upgrade the software. If a determination is made that the user does not wish to upgrade the software, the process passes to block 118 which illustrates a determination of whether or not the user wishes to select "beer drafts". If a determination is made that the user does not wish to select "beer drafts", the process passes to block 120 which illustrates a determination of whether or not the user wishes to print the payroll.

If the determination is made that the user does not wish to print the payroll, the process passes to block 122 which depicts a determination of whether or not a close-out has been performed. If a determination is made that a close-out has been performed, the process again passes to block 110.

Referring again to block 110, if a determination is made that a user wishes to print a money order log, the process passes to block 150 FIG. 3D as illustrated through block 124. Block 150 depicts the prompting of the user to enter the user's password. Next the process passes to block 152 which depicts a determination of whether or not the entered password is valid. If a determination is made that the entered password is not valid, the process passes again to block 66 as depicted through block 162. Referring again to block 152, if a determination is made that the entered password is valid, the process passes to block 154 which illustrates a determination of whether or not the money order log contains any entries. If a determination is made that the money order log does not contain any entries, the process again passes to block 66 as illustrated through block 162.

Referring again to block 154, if a determination is made that the money order log does contain entries, the process passes to block 156. Block 156 illustrates a determination of whether or not the user has selected to print the money order log. If a determination is made that the user has not selected to print the money order log, the process passes to block 66 again as depicted through block 162. Referring again to block 156, if a determination is made that the user does wish to print the money order log, the process passes to block 158 which illustrates the money order log file being sent to printer 18. Thereafter the process passes to block 160 which illustrates a determination of whether or not the user wishes to print additional copies of the money order log. If a determination is made that the user does not wish to print any additional copies of the money order log, the process again passes to block 66 as depicted through block 162. Referring again to block 160, if a determination is made that a user wishes to print additional copies of the money order log, the process again passes to block 158.

Referring again to block 111 FIG. 3C, if a determination is made that a user wishes to print an old money order log, the process passes to block 412 of FIG. 3P as illustrated through block 125. Block 412 depicts the prompting of the user to enter the user's password. Next the process passes to block 414 which depicts a determination of whether or not the entered password is valid. If a determination is made that the entered password is not valid, the process passes again to block 66 as depicted through block 162. Referring again to block 414, if a determination is made that the entered password is valid, the process passes to block 416 which prompts the user to enter the month of the log to be printed. Once the user enters the month the process passes to block 418 which prompts the user to enter the day of the log to be printed. Once the day of the log is entered the process passes to block 420 which determines whether the log to be printed exists. If the log does not exist the process passes to block 422 which briefly displays the message "MOLOG NOT FOUND" and then passes back to block 416 prompting the user for another month.

If the log does exist the process passes to block 424 which illustrates a determination of whether or not the money order log contains any entries. If a determination is made that the money order log does not contain any entries, the process again passes to block 66 as illustrated through block 162.

Referring again to block 424, if a determination is made that the money order log does contain entries, the process passes to block 426. Block 426 illustrates a determination of whether or not the user has selected to print the old money order log. If a determination is made that the user has not selected to print the old money order log, the process passes to block 66 again as depicted through block 162. Referring again to block 426, if a determination is made that the user does wish to print the old money order log, the process passes to block 428 which illustrates the money order log file being sent to printer 18. Thereafter the process passes to block 66 again as depicted through block 162.

Referring again to block 113 FIG. 3C, if a determination is made that a user wishes to access E-Mail, the process passes to block 430 FIG. 3Q as depicted through block 127. As shown in block 430 the user may chose to print or delete E-Mail files.

If the user chooses to print E-Mail files the process passes to block 432 which prompts the user to enter a password. When the password is entered the process passes to block 434 to determine if the password is valid. If the password is invalid the process passes to block 66 as depicted through block 162. If the password is valid the first E-Mail message in the log is displayed. The user may scroll through the messages using the selection keys 20. A message is selected by pressing the enter key 40 when the desired message is displayed. Pressing the enter key 40 will pass the process to block 438 which send the message to the printer 18. The process then passes to block 440 which determines whether additional files will be printed. If yes is selected the process passes back to block 436, otherwise by pressing the clear key 34 the process passes back to block 66 through block 162.

If the user chooses to delete E-Mail files the process passes to block 442 which prompts the user for a password. After the password is entered the process passes to block 444 which determines is the password is valid. If the password is invalid the process passes to block 66 through block 162. If the password is valid the process passes to block 446 which displays the file name of the first E-Mail file in the log. If the user presses the enter key 40 the process passes to block 448 where the E-Mail file is deleted. The process then passes to block 450 which determines is there are any more files in the log. If there are more files the process returns to block 446. If the log is empty the process passes to block 452 which briefly displays the message "No E-Mail Files" and then passes on to block 66 through block 162.

Referring again to block 114, if a determination is made that the user wishes to force a bulletin board service call, the process passes to block 229 as depicted through block 128 FIG. 3G. Block 229 illustrates the prompting of the user to enter the user's password. Thereafter the process passes to block 230 which illustrates a determination of whether or not the entered password is valid. If a determination is made that the user's password is not valid, the process passes to block 66 as illustrated through block 162.

Referring again to block 230, if a determination is made that the entered password is valid, the process passes to block 232 which illustrates a determination of whether or not data processing system 14 was successfully connected to data processing system 12. If a determination is made that a connection was not made, the process passes to block 66 as depicted through block 162. Referring again to block 232, if a determination is made that a connection was made, the process passes to block 234 which illustrates the displaying of a message indicating that there was a successful connection. Thereafter the process passes to block 236 which illustrates data processing system 12 conducting a bulletin board service call in accordance with the prior art. Any suitable bulletin board service may be used such as The Major BBS by Galacticomm. In accordance with the present invention, the process then again passes to block 66 as illustrated through block 162.

Referring again to block 116, if a determination is made that the user wishes to make a primary maintenance call, the process passes to block 240 as illustrated through block 130 FIG. 3H. Block 240 depicts the prompting of the user to enter the user's password. The process then passes to block 242 which illustrates a determination of whether or not the entered password is valid. If a determination is made that the entered password is not valid, the process again passes to block 66 as illustrated through block 162.

Referring again to block 242, if a determination is made that the entered password is valid, the process passes to block 244 which illustrates a determination of whether or not data processing system 14 was successfully connected to data processing system 12. If a determination is made that a connection was not successful, the process passes to block 66 as illustrated through block 162. Referring again to block 244, if a determination is made that a connection was made, the process passes to block 246 which illustrates the displaying of a message indicating a successful connection. Thereafter the process passes to block 248 which illustrates data processing system 12 conducting a maintenance call. Next, the process passes to block 66 as illustrated through block 162.

Referring again to block 115, if a determination is make that the user wishes to make a secondary maintenance call the process passes again to block 240 as illustrated through block 129. The process illustrated by FIG. 3H is conducted is the same manner as a primary maintenance call, but when block 248 is reached a different set of maintenance routines are run than in the primary maintenance.

Referring again to block 112, if a determination is made that a user wishes to perform the daily close-out, the process passes to block 170 as depicted through block 126 FIG. 3E. At a specified time each day, the manager or assistant manager closes out the store and balances the cash in the registers against the sales records. A record of money orders and beer drafts sold is kept by data processing system 14 as described above. The closeout function allows the manager to close-out data processing system 14 each day and print as many copies of the day's log of money order sales and beer drafts as needed. If no money orders have been sold and no beer drafts printed since the last daily close-out, data processing system 14 still needs to be closed out, but no daily sales record will be printed. The close-out transfers the contents of the current money order log file to a dated file which will then be sent to data processing system 12 during the daily call.

Block 170 depicts a determination of whether or not the system has already been closed out for the current date. If a determination is made that the system has already been closed out, the process passes to block 172 which illustrates the displaying of a message: "Already Closed." Thereafter the process again passes to block 66 as illustrated through block 162.

Referring again to block 170, if a determination is made that the system has not already been closed out for the current date, the process passes to block 174 which illustrates the prompting of the user to enter a password. Next the process passes to block 176 which illustrates a determination of whether or not the entered password is valid. If a determination is made that the entered password is not valid, the process again passes to block 66 as depicted through block 162. Referring again to block 176, if a determination is made that the password entered by the user is valid, the process passes to block 178 which illustrates a determination of whether or not the user wishes to print the money order log. If a determination is made that the user wishes to print the money order log, the process passes to block 150 FIG. 3D as depicted through block 124.

Referring again to block 178, if a determination is made that the user does not wish to print the money order log, the process passes to block 180 which illustrates a determination of whether or not the user wishes to complete the closing process. If a determination is made that the user does not wish to complete the closing process, the process passes again to block 66 as illustrated through block 162. Referring again to block 180, if a determination is made that the user does wish to complete the closing process, the process passes to block 182 which depicts a determination of whether or not any money orders or beer drafts have been sold since the last closing. If a determination is made that no money orders or beer drafts have been sold since the last closing, the process passes to block 184 which illustrates the creation of a dated file containing the message, "No Money Orders Sold Today."

The dated file name is determined by the time of the closeout, the close day parameter and the store identification number. If the close day parameter is set to "previous," the file name will be named according to the previous day. If the close day parameter is set to "current," the file will be named according to the current date. For example, on June 23, a file from Store #253 with the close day parameter set to "previous" will be named $253MO.622, where $ is a preset prefix, 253 identifies the store, MO is a preset parameter, and 622 indicates a close day of June 22. If the close day parameter is set to "current," on June 23, a file from Store 253 would be named $253Mo.623.

Thereafter the process passes to block 185 which illustrates the storage of the dated file in a transfer file containing a list of files to be transferred to data processing system 12. The transfer file contains the names of all files that need to be transferred from data processing system 14 to data processing system 12. Next the process passes to block 186 which illustrates the transferring of all files listed in the transfer file to data processing system 12. Thereafter the process again passes to block 66 illustrated through block 162.

Referring again to block 182, if a determination is made that money orders or beer drafts have been sold since the last closing, the process passes to block 190 which illustrates a determination of whether or not a close day perimeter is set to "current" or "previous." If the close day perimeter is set to "previous," the process passes to block 192 which illustrates setting the file name according to the previous date. The process then passes to block 196 as illustrated through block 194 FIG. 3F.

Referring again to block 190, if a determination is made that the close day perimeter is set to "current," the process passes to block 198 which illustrates the setting of the file name according to the current date. Thereafter the process passes to block 196 as depicted through block 194.

Block 196 illustrates including the name of the dated file in the transfer file. Next the process passes to block 204 which illustrates a determination of whether or not this is the last day of the current month. The money order and beer drafts logs are stored within data processing system 14 up to one month. The close-out function deletes the files created on the same day of the previous month. On the last day of the month the close-out function deletes all of the remaining files from the previous month.

For example, on April 3, the close-out function creates the files dated April 3 and deletes the files dated March 3. On April 30, the last day of the month, the close-out function creates the files dated April 30 and deletes not only the files dated March 30, but also the files dated March 31.

Referring to block 204, if a determination is made that this is the last day of the current month, the process passes to block 205 which depicts clearing the current money order and beer draft files. Block 206 illustrates the deletion of all files from the previous month. Thereafter the process passes to block 208 which illustrates the transferring of the files listed in the transfer file to data processing system 12. The process again passes to block 66 as depicted through block 162.

Referring again to block 204, if a determination is made that this is not the last day of the current month, the process passes to block 210 which illustrates the clearing of the current money order and beer draft files. Thereafter the process passes to block 212 which illustrates the deletion of the files from the same date of the previous month. Next the process again passes to block 208 and thereafter to block 66 as illustrated through block 162.

Referring again to block 119, if a determination is made that the user-wishes to select daylight savings, the process passes to block 454 as illustrated through block 133 FIG. 3R. As shown in block 454 the user may chose to spring forward or fall back.

If the user chooses to spring forward the process passes to block 456 which prompts the user to enter a password. When the password is entered the process passes to block 458 to determine if the password is valid. If the password is invalid the process passes to block 66 as depicted through block 162. If the password is valid the process passes to block 460 and "Current Time hh:mm" is displayed. The process then passes to block 462 which displays "Change to: hh:mm" where hh:mm is one hour later than in block 460. The process then passes to block 464. If the uses selects not to change, the process passes back to 66 through block 162. If the user decides to change the process passes to block 468 which updates the time by adding an hour, and then the process passes back to 66 through block 162.

If the user chooses to fall back the process passes to block 470 which prompts the user for a password. After the password is entered the process passes to block 472 which determines is the password is valid. If the password is invalid the process passes to block 66 through block 162. If the password is valid the process passes to block 474 which briefly displays the message "Current Time: hh:mm," and then passes the process to block 476 which displays the message "Change to: hh:mm" where hh:mm is one hour earlier than the time of block 474. The process passes to block 478 where the user chooses whether to change. If the user chooses not to change the process passes to block 66 through block 162. If the user decides to change the process passes to block 480 which updates the time by subtracting an hour, and then the process passes back to 66 through block 162.

Referring again to block 121, if a determination is made to upgrade the software, the process passes to block 484 as illustrated through block 135 FIG. 3S. Block 484 prompts the user for a password. After the password is entered the process passes to block 486 which determines is the password is valid. If the password is invalid the process passes to block 66 through block 162. If the password is valid the process passes to block 488 in which the home office upgrades the software. After the upgrade is complete the process restarts by passing back to block 61 through block 60.

Referring again to block 118, if a determination is made that the user wishes to select "beer drafts", the process passes to block 260 as illustrated through block 132 FIG. 3I. Block 260 depicts the establishment of a beer draft log. Each time a beer draft is printed a description of the beer draft is entered into the current beer draft log file. The description includes the date and time the draft is printed, the store where the beer draft is printed, the amount of the beer draft, the check number, the vendor invoice number and the vendor name.

Thereafter the process passes to block 262 which illustrates the establishment of a file which may contain valid vendor names and their associated vendor identification numbers. Next the process passes to block 264 which illustrates the prompting of the user to enter the user's password. Thereafter the process passes to block 266 which illustrates a determination of whether or not the entered password was valid. If a determination is made that the entered password was not valid, the process passes to block 66 as illustrated through block 162. Referring again to block 266, if a determination is made that the entered password is valid, the process passes to block 268 which illustrates the specification of a vendor identification number.

The process then passes to block 270 which illustrates a determination of whether or not the specified vendor identification number is valid. If a determination is made that the vendor identification number is not valid, the process passes to block 66 as illustrated through block 162. Referring again to block 270, if a determination is made that the specified vendor identification number is valid, the process passes to block 272 which illustrates the specification of an invoice number. Thereafter the process passes to block 274 which illustrates the entering of an amount for the beer draft. Next the process passes to block 276 which illustrates a determination of whether or not the entered amount is less than or equal to $2,500. A maximum amount for a beer draft may be arbitrarily set by the home office to limit its liability. If the entered amount is not less than or equal to $2,500, the process again passes to block 274. Referring again to block 276, if a determination is made the entered amount is less than or equal to $2,500, the process passes to block 290 as illustrated through block 278 FIG. 3J.

Block 290 illustrates the determination of a fee to be collected from the customer for the beer draft. Thereafter the process passes to block 292 which illustrates the displaying of the total amount to be collected which includes the amount of the beer draft plus the fee to be collected. Block 294 illustrates the association of an identifying number with the amount of this beer draft. Thereafter block 296 illustrates the displaying of the identifying number of this beer draft. Thereafter the process passes to block 298 which illustrates a determination of whether or not the user wishes to print another beer draft for the same vendor and same invoice number. If a determination is made that the user does wish to print another beer draft, the process passes back to block 274 as illustrated through block 300.

Referring again to block 298, if a determination is made that the user does not wish to print another beer draft for the same vendor and invoice number, the process passes to block 302 which illustrates the storage of the identifying number with its associated amount for each beer draft in the beer draft log. Thereafter the process passes to block 304 which illustrates a determination of whether or not the user wishes to print the beer draft. If the determination is made that the user does not wish to print the beer draft, the process passes to block 66 as illustrated through block 162. Referring again to block 304, if a determination is made that the user does wish to print the beer draft, the process passes to block 306 which illustrates the printing of beer drafts for the amount indicated in the beer draft log. The process then passes to block 66 as illustrated through block 162.

Referring again to block 120 FIG. 3C, if a determination is made that the user wishes to print the payroll, the process passes to block 310 as illustrated through block 134, FIG. 3K. Block 310 illustrates the prompting of the user to enter the user's password. The process then passes to block 312 which illustrates a determination of whether or not the entered password is a valid manager's password. If a determination is made that the entered password is not a valid manager's password, the process again passes to block 66 as illustrated through block 162.

Referring again to block 312, if a determination is made that the entered password is a valid manager's password, the process passes to block 314 which illustrates a determination of whether or not data processing system 12 has downloaded to data processing system 14 all files needed to print the payroll. If a determination is made that data processing system 12 has not downloaded all necessary files, the process again passes to block 66 as illustrated through block 162. Referring again to block 314, if a determination is made that data processing system 12 has downloaded all necessary files, the process passes to block 316 which illustrates a determination of whether or not the current date matches the date contained within the payroll file. If a determination is made that the current date does not match the date contained within the payroll file, the process again passes to block 66 as illustrated through block 162.

Referring again to block 316, if a determination is made that the current date does match the date contained within the payroll file, the process passes to block 318 which illustrates a determination of whether or not printer 18 is ready to print the payroll. If a determination is made that printer 18 is not ready to print the payroll, the process again passes to block 66 as illustrated through block 162. Referring again to block 318, if a determination is made that printer 18 is ready to print the payroll, the process passes to block 320 which illustrates printing of the payroll. The process then passes to block 321 which depicts the storage of the name of the printed payroll file. Thereafter, the process passes to block 322 which illustrates the deletion of the payroll file stored within data processing system 14. The process again passes to block 66 as illustrated through block 162.

Referring again to block 122, if a determination is made that a close-out has not been performed at the scheduled close-out time, the process passes to block 328 as illustrated through block 136, FIG. 3L. If the manager or assistant manger fails to close-out data processing system 14 by the specified close-out time, data processing system 14 will automatically close out and print two copies of the money order log file if any money orders have been sold since the last close-out and two copies of the beer draft file if any beer drafts have been printed since the last close-out. The file suffix of the dated file is controlled by two parameters during a force closeout to allow the force closeout to occur on the following day. The close day parameter is applied first as described above. Then the force day parameter is applied.

For example, suppose store 999 is scheduled to close-out at 11:50p.m. every day and that today is July 6. If the close day parameter is set to "current" and the force day parameter is set to "previous," and the force close-out is 3:00a.m., the manager must close out before 3:00a.m. to avoid a forced close-out. If the manager does close-out before 3:00a.m., the close file will be named $999MO.706 where $ is preset, 999 indicates the store number, MO is preset, and 706 indicates the current date. However, if the manager does not close-out before 3:00 a.m., the file will also be named $999Mo.706 where $ is preset, 999 indicates the store number, MO is preset, and 706 indicates the previous day because the close actually occurred about 3:00a.m. on July 7.

Block 328 illustrates specifying a force close-out time. Thereafter the process passes to block 330 which depicts a determination of whether or not the force day perimeter is set to "present" or "current." If a determination is made that the force day perimeter is set to "previous," the process passes to block 334 which depicts the setting of the force close-out file name to include the previous date. Thereafter the process passes to block 336.

Referring again to block 332, if a determination is made that the force close day perimeter is set to "current," the process passes to block 338 which depicts setting the force close-out file name to include the current date. Once again the process passes to block 336 which depicts a determination of whether or not any money orders have been sold since the last close-out. If a determination is made that money orders have been sold since the last close-out, the process passes to block 340 which depicts printing two copies of the money order and beer draft logs. Thereafter the process once again passes to block 190 as depicted through block 202. Referring again to block 336, if a determination is made that no money orders have been sold, the process once again passes to block 190 through block 202, FIG. 3E.

Referring again to block 72, if a determination is made that the user wishes to print a cancellation form, the process passes to block 404 as depicted through block 82, FIG. 3M. Block 404 depicts the printing of a cancellation form. Sometimes a money order is printed that is not needed, or is printed incorrectly. However, in both of these cases, an entry was places in the money order log. A cancellation form may be printed to be used to report the unused money order. The process once again passes to block 66 as illustrated through block 162.

Referring again to block 74, if a determination is made that the user wishes to print a refund form, the process passes to block 406 as depicted through block 84, FIG. 3N. Block 406 depicts the determination of whether or not the user wishes to print a refund form in English or Spanish. If a determination is made that the user wishes to print the form in English, the process passes to block 408 which depicts the printing of the form in English. The process thereafter once again passes to block 66 as illustrated through block 162. Referring again to block 406, if a determination is made that the user wishes to print the refund form in Spanish, the process passes to block 410 which illustrates the printing of the refund form in Spanish. The process then passes to block 66 as illustrated through block 162.

Referring to block 75, if a determination is made that the user wishes to display version information control passes to block 85 which briefly displays the version number and then passes to block 66 through block 162.

Referring to block 76, if a determination is made that the user wishes to download fonts to printer 18, the process passes to block 400 as illustrated through block 86, FIG. 3O. Block 400 illustrates downloading the fonts to printer 18. Next the process passes to block 402 which illustrates a determination of whether or not data processing system 14 was able to download the fonts. If a determination is made that the fonts were successfully downloaded, the process again passes to block 66 as illustrated through block 162. Referring again to block 402, if a determination is made that the fonts were not successfully downloaded, the process passes to block 403 which illustrates a determination of whether or not the user wishes to attempt to download fonts again. If a determination is made that the user does not wish to again attempt to download fonts, the process passes to block 66 as illustrated through block 162. Referring again to block 403, if a determination is made that the user does wish to again attempt to download fonts, the process passes back to block 400.

Figure 4:
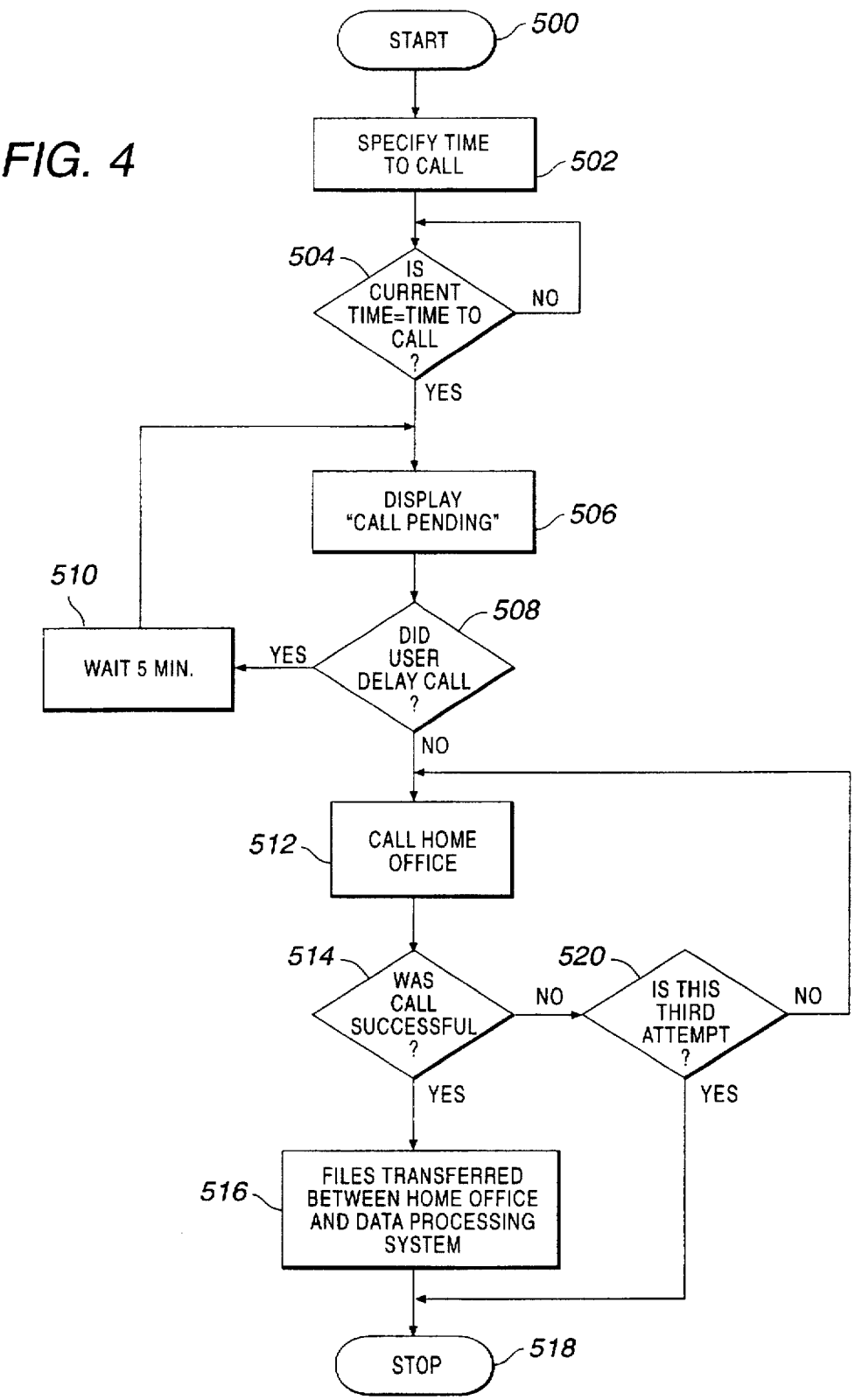
FIG. 4 is a high level flow chart which depicts data processing system 12 communicating with data processing system 14 in accordance with the present invention.

FIG. 4 depicts a high level flow chart illustrating data processing 12 system communicating with data processing system 14 in accordance with the present invention. The process starts as depicted at block 500. Thereafter the process passes to block 502 which illustrates the specification of a time during which data processing system 14 is to attempt to communicate with data processing system 12 utilizing telephone system 16. Next the process passes to block 504 which depicts a determination of whether or not the current time is the same as the specified time. If a determination is made that the current time is not the specified time, the process passes again to block 504.

If a determination is made that the current time is the specified time, the process passes to block 506 which depicts the displaying of a "Call Pending" message. Thereafter, the process passes to block 508 which depicts a determination of whether or not the user wishes to delay the call. If a determination is made that the user does wish to delay the call, the process passes to block 510 which illustrates waiting five minutes. The process then passes back to block 506.

Referring again to block 508, if a determination is made that the user does not wish to delay the call, the process passes to block 512 which depicts data processing system 14 calling data processing system 12 utilizing telephone system 16. Thereafter the process passes to block 514 which illustrates a determination of whether or not data processing system 14 was successfully connected to data processing system 12. If a determination is made that the two systems were successfully connected, the process passes to block 516 which depicts the transferring of files between the two data processing systems. The process then terminates as depicted at block 518.

Referring again to block 514, if a determination is made the call was not successfully connected, the process passes to block 520 which illustrates a determination of whether or not this is the third attempt at making a successful connection. If a determination is made that this is the third attempt, the process passes to block 518. Referring again to block 520, if a determination is made that this is not the third attempt, the process passes to block 512.

While the invention has been particularly shown and described with reference to a preferred embodiment, it will be understood by those skilled in the art that various changes in form and detail may be made therein without departing from the spirit and scope of the invention.

What is claimed is:

1. A method for creating money orders and vendor drafts using a data processing system and a printer at each of a plurality of remote stores, where each of the plurality of the remote stores is able to communicate with a home office using a communication device connected to the data processing system, the method comprising the steps of:

a) awaiting the selection by a user using the data processing system to create a transaction which is either a money order or a vendor draft requiring a plurality of parameters to create, the plurality of parameters including a dollar amount;

b) prompting the user using the data processing system for entry of each of the plurality of parameters necessary to create the transaction;

c) entering a number associated with the transaction and the dollar amount of the transaction in a log on the data processing system;

d) printing the transaction on the printer;

e) repeating steps (a) through (d) as necessary to create the required money orders or vendor drafts;

f) sending the log to the home office using the communication device at specific intervals; and g) assembling at the home office the logs from each of the plurality of remote stores and creating a database of all transactions at all remote stores.

2. The method of claim 1 wherein the plurality of parameters further includes a date for both the money order and the vendor draft and a vendor ID and an invoice number for the vendor draft.

3. The method of claim 1 wherein the step of printing the transaction on the printer includes printing the transaction using blank paper and MICR toner to create a valid financial instrument.

4. The method of claim 1 further including between steps (a) and (b), the step of prompting the user for entry of a password if the transaction is a vendor draft.

5. The method of claim 1 further including between steps (b) and (c), the step of verifying that the dollar amount is less than a predetermined maximum dollar amount.

6. A method for creating payroll checks at each of a plurality of remote stores, where each of the plurality of remote stores is able to communicate with a home office having a home office data processing system using a communication device connected to the data processing system, the method comprising the steps of:

a) sending payroll information, including employee hours, to the home office;

b) calculating a payroll amount, using the home office data processing system, based on the employee hours, thereby creating a payroll file;

c) splitting the payroll file into payroll subfiles having the payroll amounts, each payroll subfile corresponding to one of the plurality of remote stores;

c) transmitting each payroll subfile to each corresponding remote store from the home office; and d) printing payroll checks for each of a plurality of employees at the remote store.

7. The method of claim 6 where the step of sending payroll information to the home office, comprises the steps of:

i) entering employee hours for a payroll period for each employee at each of the plurality of remote stores into the data processing system at each of the plurality of remote stores;

ii) transmitting the employee hours to the home office using the communications device connected to the data processing system.

8. The method of claim 6 wherein the step of calculating a payroll amount further including calculating payroll deduction amounts.

9. The method of claim 8 wherein the step of printing payroll checks includes printing payroll stubs showing the payroll deduction amounts.

10. The method of claim 6 further including prior to step (a) the steps of:

i) selecting payroll from a menu of options;

ii) entering a manager's password to access payroll functions.

11. A system for managing financial instruments required by each of a plurality of remote stores which are controlled by a home office, the financial instruments including money orders, vendor drafts, and payroll checks, the system comprising:

a) a printer at each of the remote locations able to print the financial instruments;

b) a controller at each of the plurality of remote stores connected to the printer, the controller including a display and a keypad, the display active to prompt a user for entry of a selection or data required to complete the selection, the selection being chosen from a list including creating money orders, creating vendor drafts, and printing payroll, the keypad able to send data from a user to the controller; and c) a central processing system at the home office connected to the controller by a communications device, the central processing station receiving a log from each of the plurality of remote stores, the log containing all the money orders and vendor drafts issued by the remote location for a particular time period, and the central processing station calculating payroll amounts and deductions based on payroll information from each of the plurality of remote stores, where the payroll amounts and deductions are sent to each of the plurality of remote stores where the payroll checks and associated stubs are printed on the printer.

12. The system of claim 11 wherein the payroll information is entered into the controller at each of the plurality of remote stores and sent to the central processing station by the communications device.

13. The system of claim 11 wherein the controller includes password protection to prevent unauthorized users from accessing the system.

14. The system of claim 11 wherein the printer is able to print the financial instruments on blank paper.

15. The system of claim 11 wherein the controller stores vendor ID's which when entered by the user correspond to a particular vendor, and wherein the particular vendor is printed on the vendor draft as payee.

* * * * *